Dec. 10, 1968
R. F. GERISCH
3,415,352
TRANSPORTING SYSTEM AND METHOD
Filed Oct. 21, 1965
9 Sheets-Sheet 1
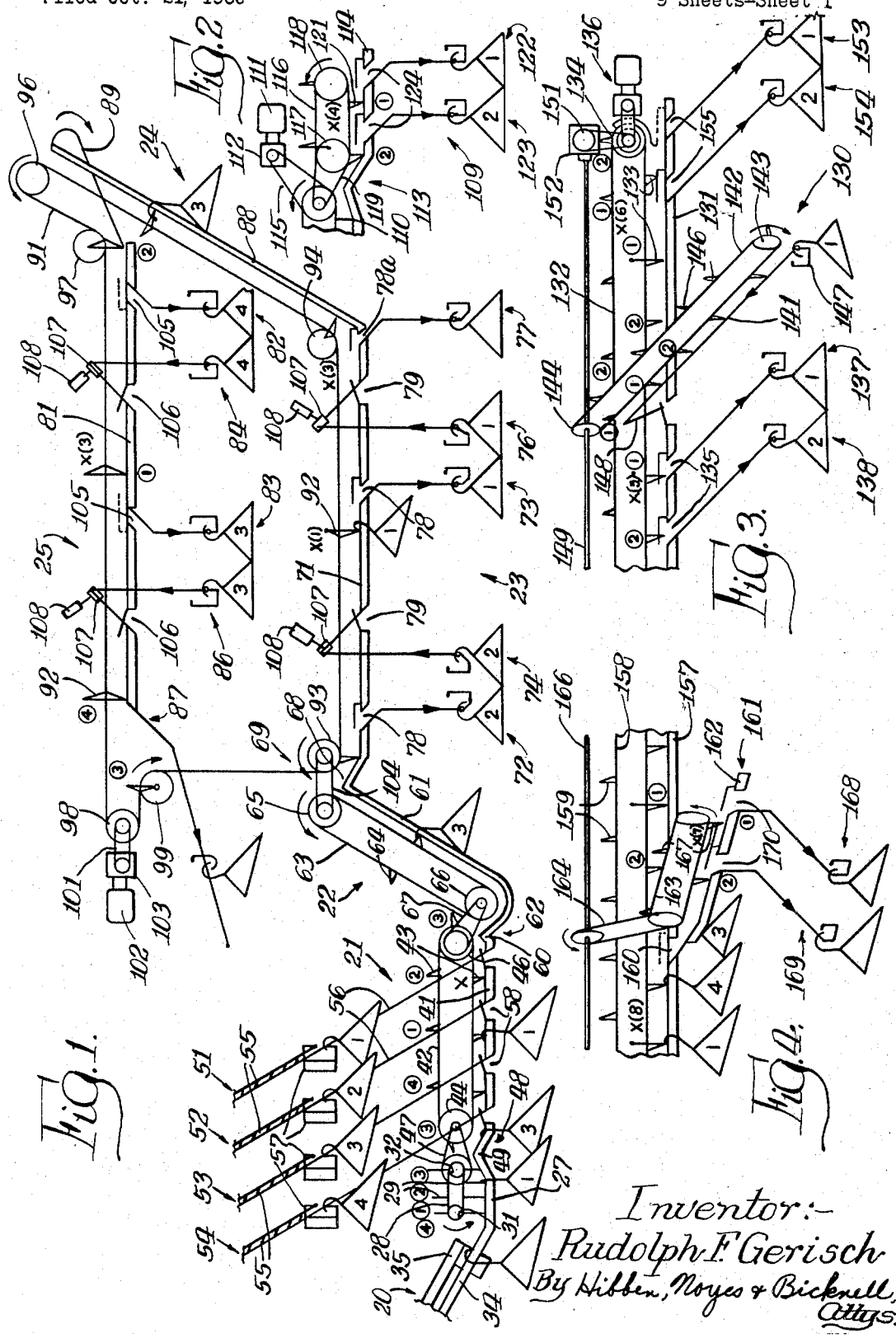
Inventor:-
Rudolph F. Gerisch
By Hibben, Noyes & Bicknell,
Attys.

Dec. 10, 1968 R. F. GERISCH 3,415,352
TRANSPORTING SYSTEM AND METHOD
Filed Oct. 21, 1965 9 Sheets-Sheet 2
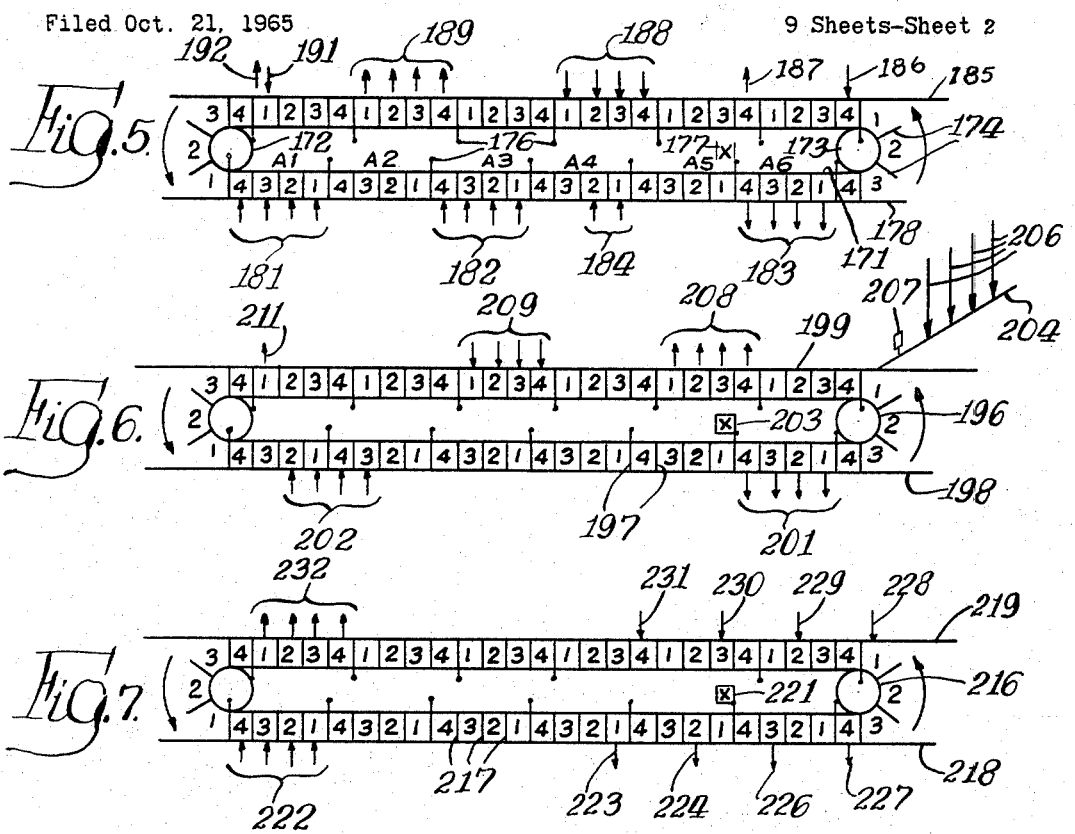
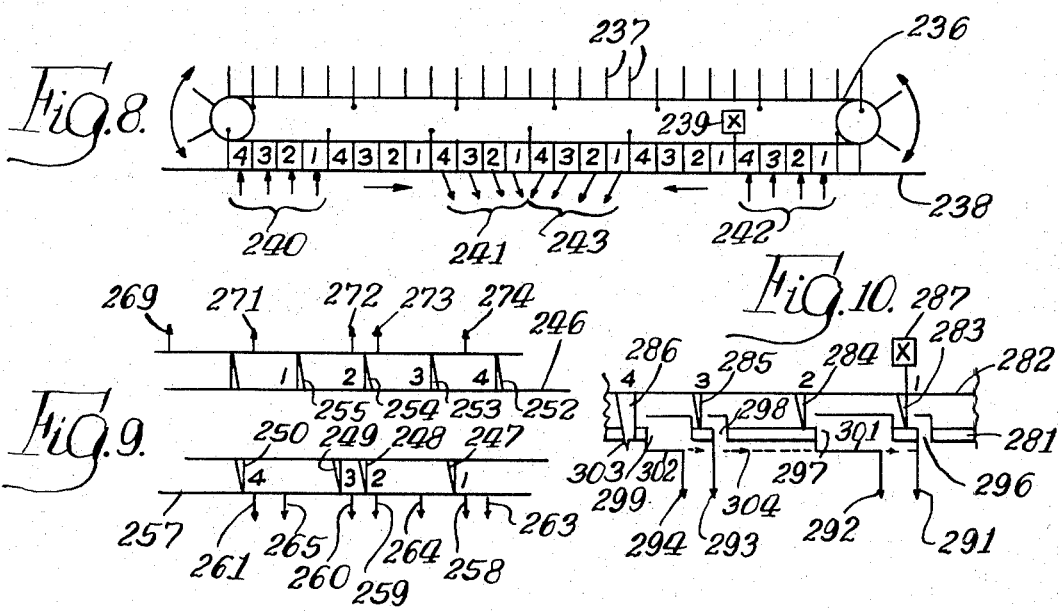

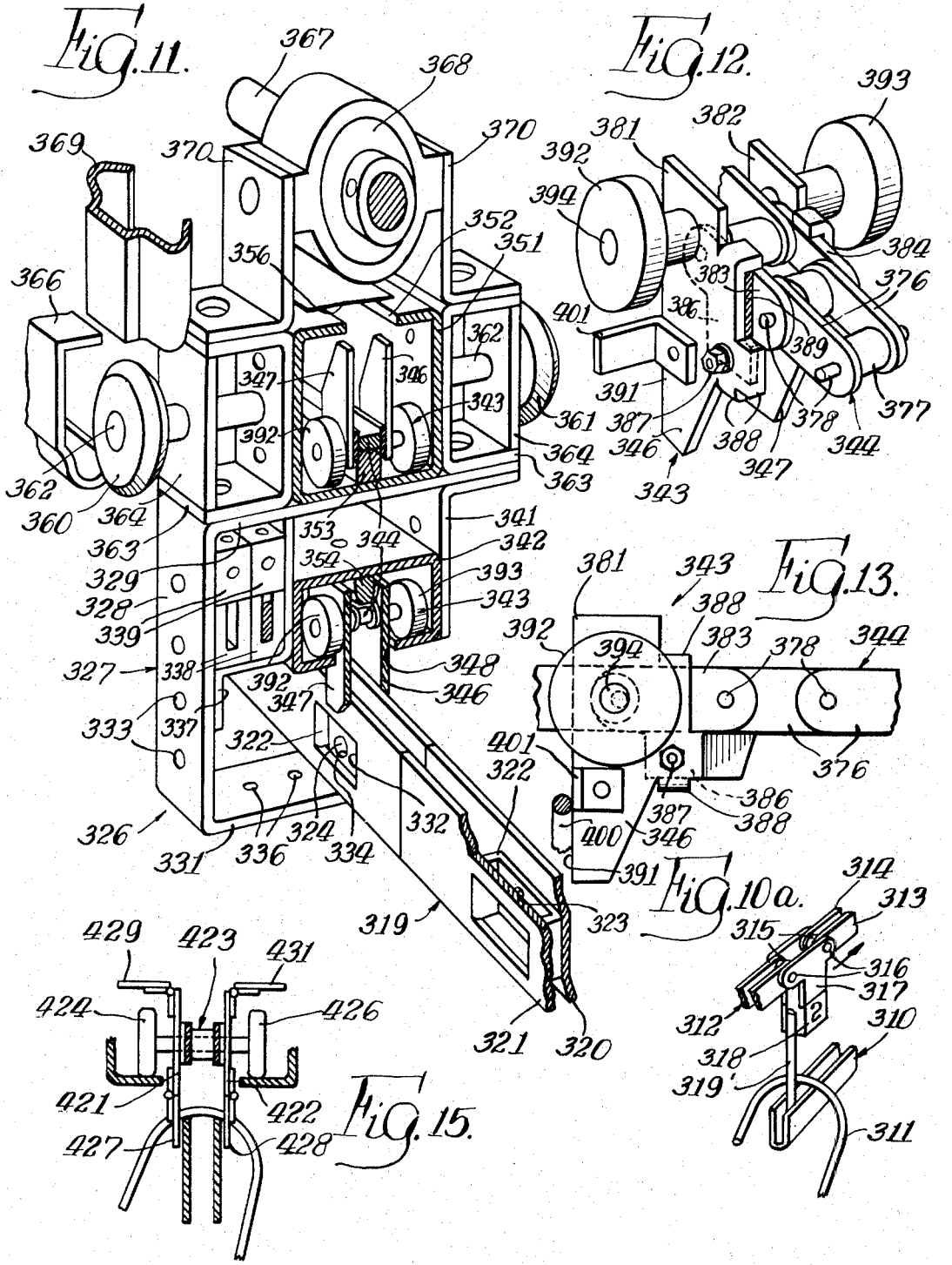

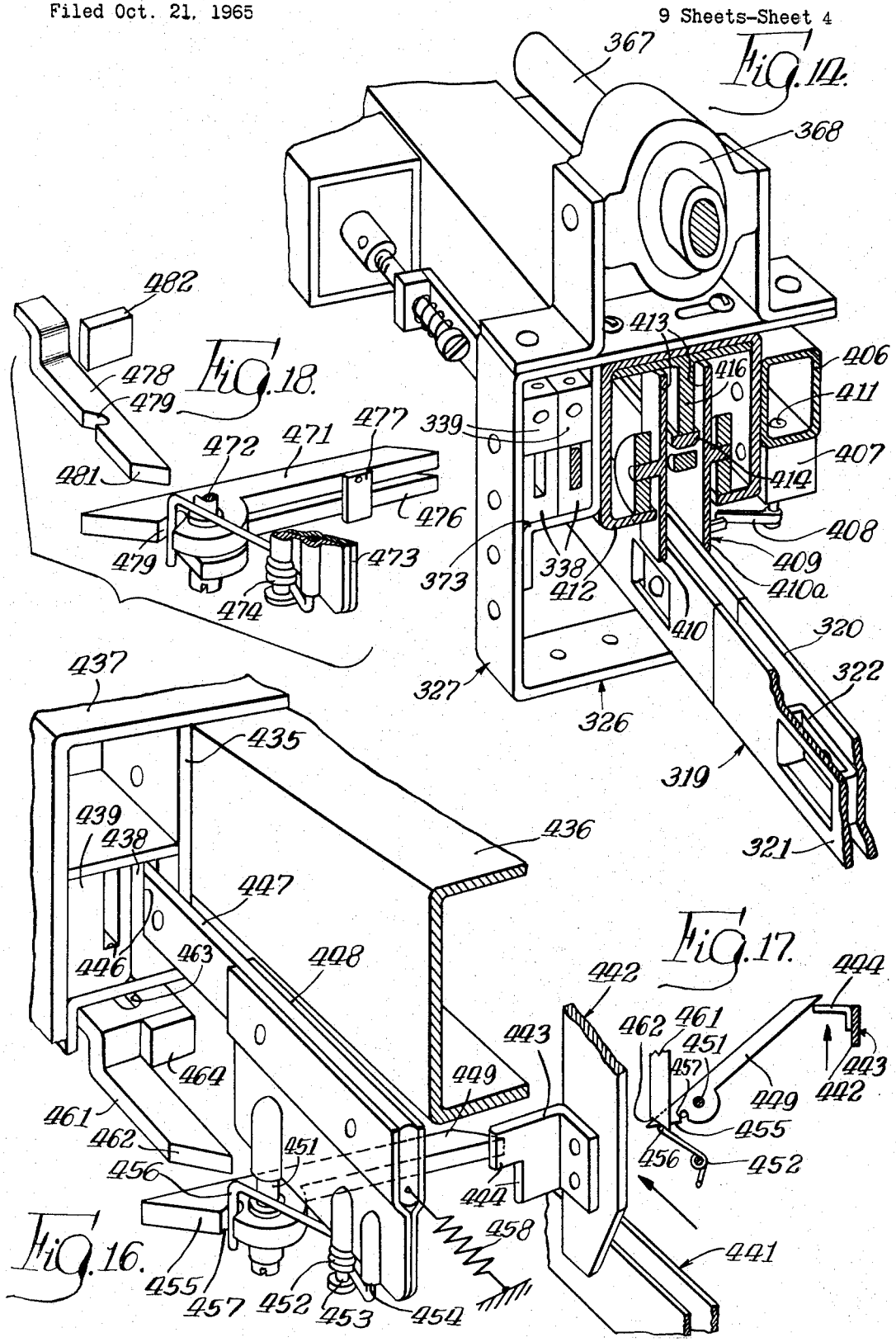

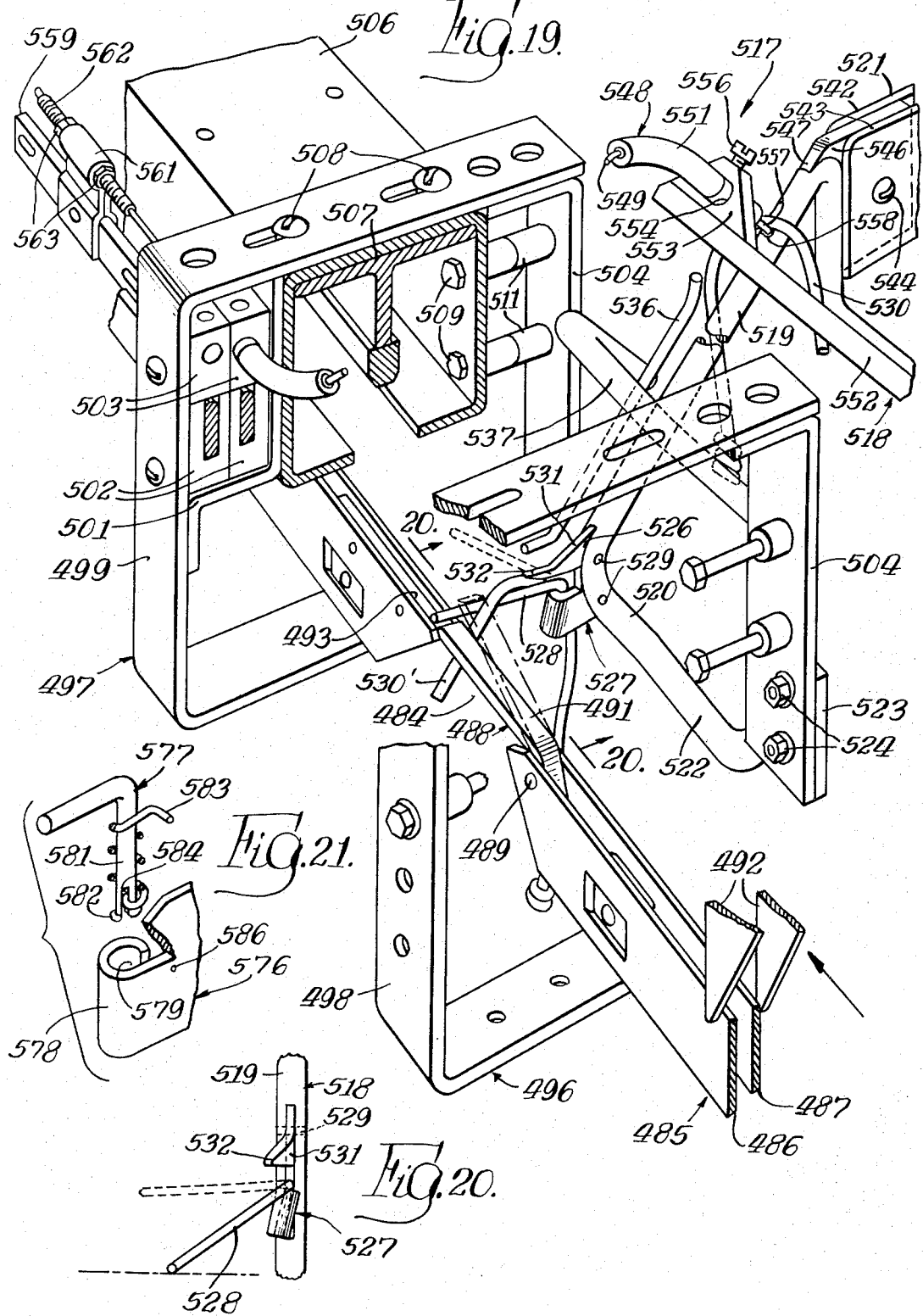

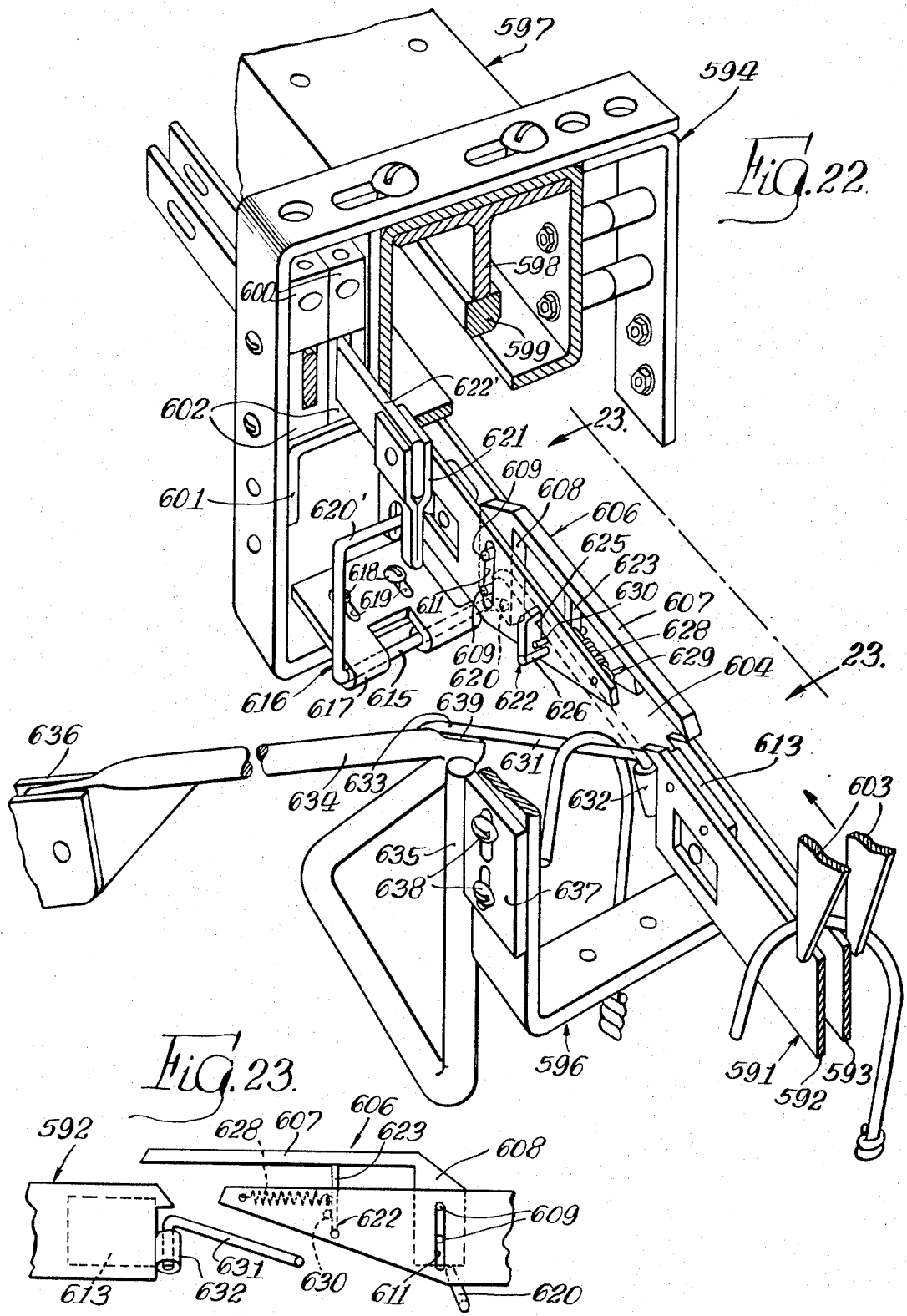

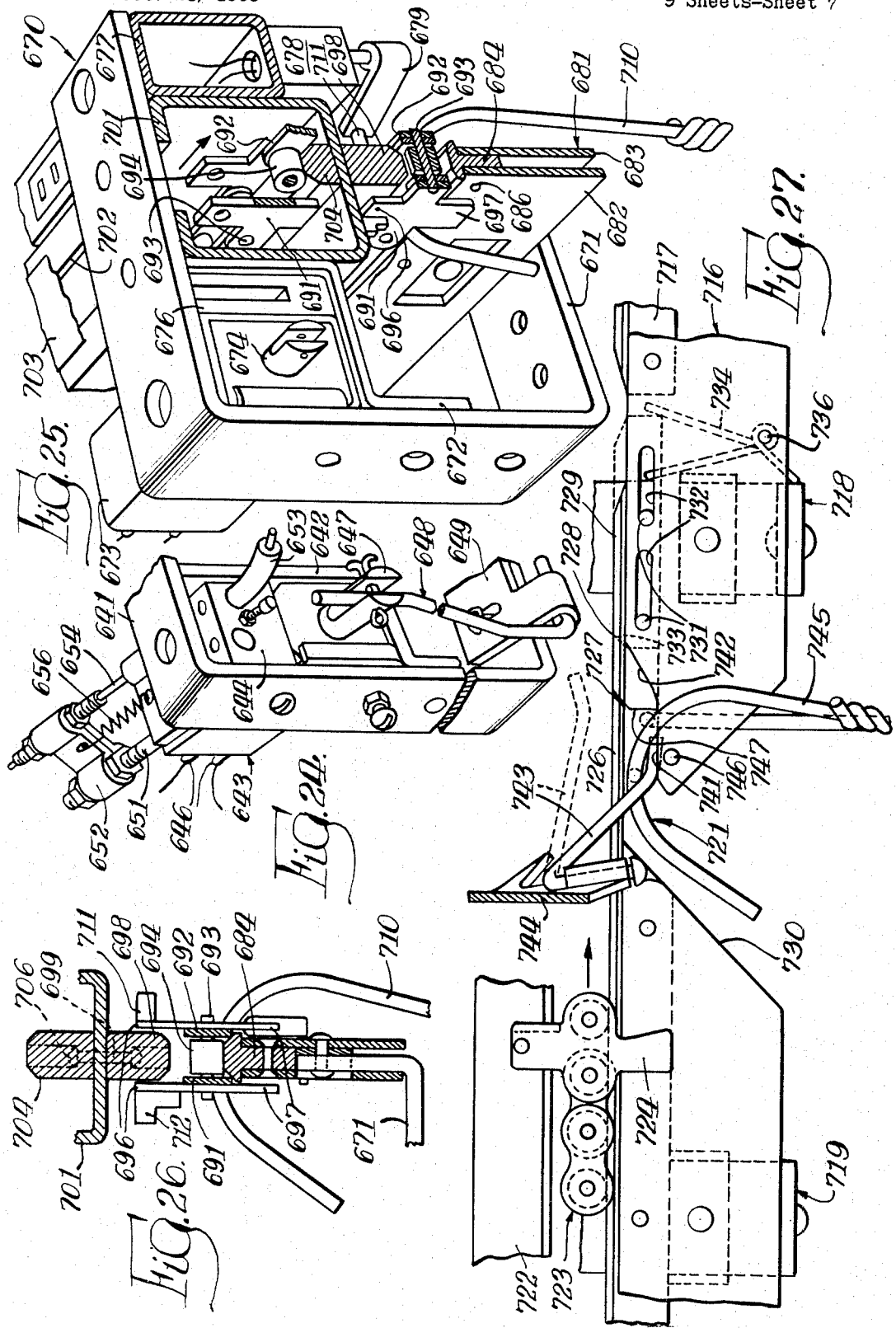

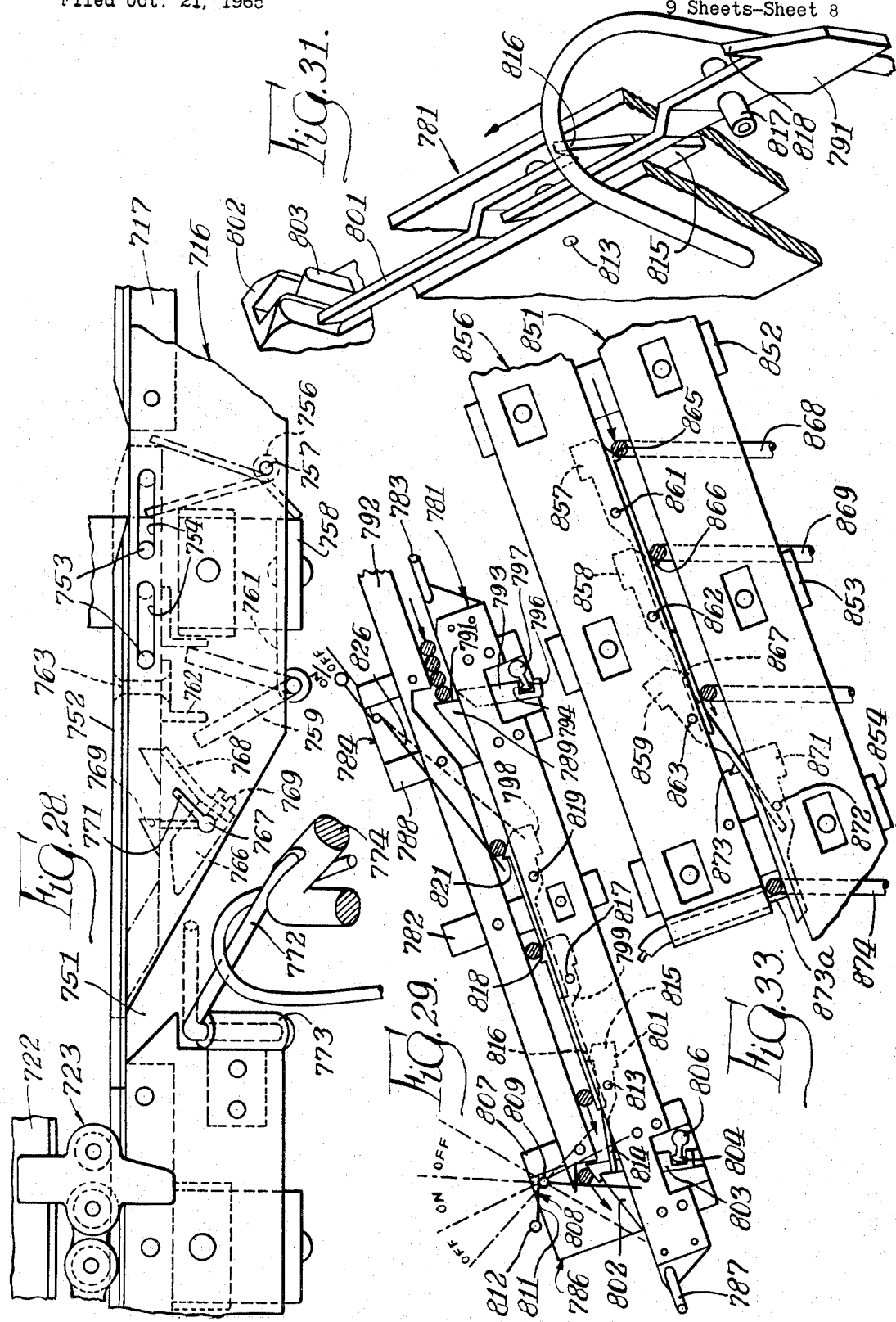

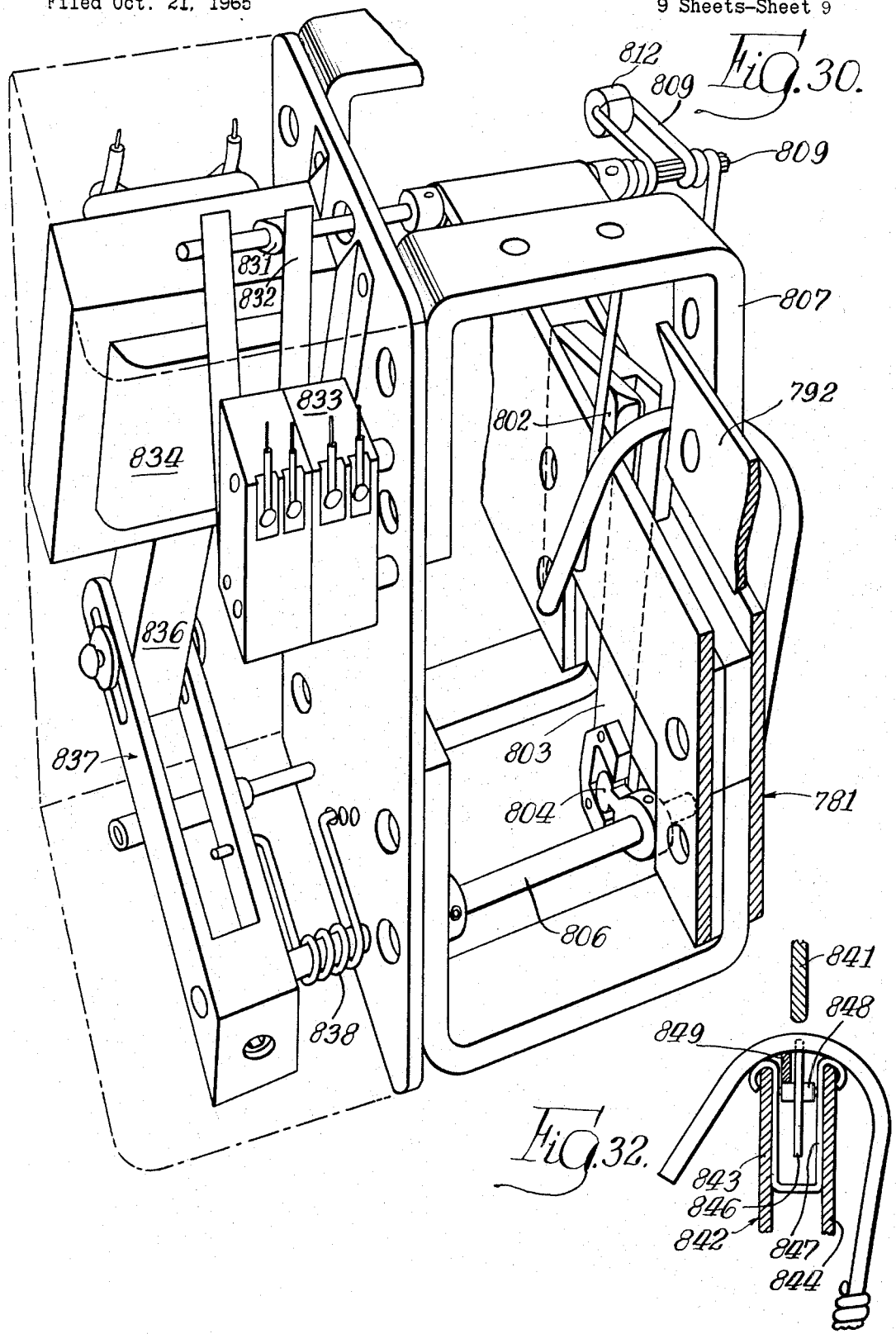

United States Patent Office 3,415,352
Patented Dec. 10, 1968

3,415,352
TRANSPORTING SYSTEM AND METHOD
Rudolph F. Gerisch, 1317 Portsmouth Ave.,
Westchester, Ill. 60153
Filed Oct. 21, 1965, Ser. No. 499,421
21 Claims. (Cl. 198—38)

ABSTRACT OF THE DISCLOSURE

Disclosed herein is a transporting system for moving hangers or other articles from an input station to preselected discharge or disbursing stations. The transporting system includes a feed section having closely spaced forks or elements for moving articles to a distributor section. The distributor section has relatively widely spaced forks or elements for moving the articles to the spaced apart disbursing stations. The ratio of the spacing of the elements of the feed section to the speed of movement of these elements is the same as the ratio of the spacing of the elements of the distributor section to the speed of movement of the distributor section. An actuator is advantageously provided for simultaneously releasing a plurality of articles at a plurality of preselected delivery stations.

---

This invention relates to a novel system and method for sorting and transporting articles, particularly articles adapted to be suspended by hooks or the like.

In dry cleaning and laundry plants, and clothing manufacturing and retailing plants, it is customary to transport garments on hangers from one location in the plant to another for the purpose of storing or shipping the garments, and numerous conveyor schemes have been devised for this purpose. In addition to transporting such articles from one location to another, it is also desirable in many cases to have some convenient sorting arrangement so that the articles may be transported to and assembled in sorted groups at different locations. My invention utilizes a novel principle which makes it possible to transport articles in any desired sorted relation between a loading point and any number of delivery points while maintaining the predetermined sorted relation of the articles at all times so that there is no possibility of error. Although the invention has particular utility in the dry cleaning and laundry fields, the principles may be employed wherever it is necessary to handle articles having a hook or articles suspended from a hook.

Accordingly, one object of the invention is to provide a novel and improved apparatus for sorting articles and transporting the same in predetermined sorted relation.

A further object of the invention is to provide a novel and improved apparatus of the foregoing character, which is especially adapted to handle articles suspended from hooks or the like.

Another object of the invention is to provide a novel and improved system of the foregoing character, which includes a feed mechanism in combination with a distributing mechanism having a number of discharge stations, and means for operating the mechanisms in timed relation so that articles introduced at the feed mechanism in predetermined sorted relation are ultimately discharged from the distributing mechanism at the proper discharge stations.

A still further object is to provide a novel and improved system of the foregoing character, which includes a plurality of injectors for injecting articles at spaced locations along the distributing mechanism and means for operating the injectors in timed relation with the feed and distributing mechanisms.

An additional object of the invention is to provide a novel and improved transporting and sorting system which is comparatively simple, compact, and inexpensive, but which at the same time offers wide flexibility of application and can conveniently accommodate the sorting of articles into a large number of groups.

Still another object of the invention is to provide a novel sorting and transporting method, whereby a plurality of articles are segregated into sorted groups at a feed station, transported in sorted relation to a plurality of remotely located discharge stations, and simultaneously discharged in sorted groups at said discharge stations.

Still another object is to provide a novel and improved system of the foregoing character, wherein the ratio of spacing to speed of pusher members of various sections of the system is maintained the same for the various sections.

Other objects and advantages of the invention will become apparent from the following detailed description taken in conjunction with the accompanying figures of the drawings, in which:

FIG. 1 is a schematic illustration of a transporting and sorting system embodying the invention;

FIGS. 2 to 4 are schematic diagrams of portions of alternate forms of the system shown in FIG. 1;

FIGS. 5 to 10 are schematic diagrams illustrating the operations of various forms of the system; and FIGS. 10a and 11 to 33 show structural components which may be used in the systems of FIGS. 1 to 10.

The system shown in FIG. 1 comprises a first or auxiliary space feeder section 20, a second space feeder section 21, a first lift section 22, a lower removal section 23, a second lift section 24, and an upper removal section 25. The sections 20 to 25 are connected together and constructed such that articles inserted into the system at the feeder sections 20 and 21 will be transported to proper disbursing stations at the removal sections 23 and 25.

The first space feeder section 20 comprises a generally horizontally disposed support channel or rail 27, the construction and mounting of which will be described in greater detail hereinafter. Above the rail 27 is an endless chain 28 having a plurality of auxiliary feeder section elements or pusher forks 29 secured thereto at spaced locations along the length of the chain 28. Although chain-mounted pusher forks or carriages are illustrated and described herein, it should be understood that any suitable pushing means may be utilized for conveying hangers or the like throughout the system. The chain 28 is trained around a pair of sprockets 31 and 32 and is rotated in the counter-clockwise direction as seen in FIG. 1 by a drive motor to be described. The chain 28 and the forks 29 are positioned relative to the rail 27 such that the forks on the lower side of the chain 28 move from left to right adjacent the rail 27. Thus a hook, or a member having a hook shaped portion, supported on the rail 27 will be engaged by one of the forks 29 and moved from left to right as seen in FIG. 1.

Also included in the first space feeder section 20 is a hanger storage and injector mechanism including an inclined support rail 34 and an injector mechanism 35, which are designed to hold hangers at spaced locations along the length of the support rail 34 and release the front hanger, the release being either manually or automatically actuated. Hangers so released slide down the support rail 34 and onto the rail 27 of the feeder section 20. Such a release may be timed with the arrival of a selected fork 29 so that the released hook will be engaged by the selected fork and moved toward the right, along with other hangers which are manually inserted on the rail 27.

The forks 29 of the first space feeder section 20 preferably have identifying indicia on them, indicative of different disbursing stations on the removal sections 23 and 25. The construction is preferably such that each disbursing station is identified or associated with one or more of the forks 29. Thus, an operator at the feeder section 20 may insert a hook on the rail 27 in front of a selected fork 29 and be assured that the hook will be conveyed to the disbursing station associated with the selected fork. In the system shown in FIG. 1, there are four disbursing stations at spaced locations along the removal sections 23 and 25, and consequently the forks 29 are consecutively numbered 1, 2, 3 and 4. Eight of the forks 29 are provided in this instance, and they are divided into two groups or series of four forks each. Briefly, the system is such that the forks 29 labeled No. 1 are associated with the No. 1 disbursing station, the forks 29 labeled No. 2 are associated with the No. 2 disbursing section, etc., and a hook positioned on the rail 27 in front of a No. 1 fork will be moved to No. 1 disbursing station, etc.

The second space feeder section 21 also includes a generally horizontally disposed support rail 41 and an endless chain 42 having a plurality of spaced forks 43 secured thereto. Again, the chain 42 is trained around a pair of sprockets 44 and 46 and is connected to be rotated counter-clockwise as seen in FIG. 1, such that the forks 43 sweep across the support rail 41 from left to right.

Each disbursing station at the removal sections may also be associated with one or more of the forks 43 and therefore a relation must be maintained between the forks 29 and the forks 43. To maintain this relation, the endless chains 28 and 42 are connected together by a drive chain 47 which interconnects the two sprockets 32 and 44.

In the construction shown, eight forks 43 are provided, and they are divided into two groups or series of four forks each. The forks 43 are located on the chain 42 such that, as a fork 29 pushes a hanger from the section 20 into the section 21, a fork 43 which is associated with the same disbursing station as the selected fork 29, engages the hook and moves it through the section 21.

It is preferred that the chain 42 move at a considerably faster rate than the chain 28, and, to accomplish this, the teeth ratio of the sprockets carrying the drive chain 47 is such that a 1-to-4 speed ratio, for example, exists between the chains 28 and 42. Since the chain 42 moves four times as fast as the chain 28, the forks 43 of the section 21 may be spaced a correspondingly greater distance apart. Furthermore, since the number of forks 43 is equal to the number of forks 29, and the forks 43 are spaced farther apart, it follows that the length of the feeder section 21 may be considerably greater than the length of the feeder section 20.

The two feeder sections 20 and 21 are connected together by section 48 which includes a support rail having an upwardly extending hump or bulge 49. The purpose of the hump 49 is to transfer the hangers from the section 20 to the section 21, the adjacent ends of these two sections being spaced a short distance apart. The forks 29 of the section 20 move hangers along the rail 27 to the top of the hump 49 and, due to the timed relation between the forks 29 and 43, each time a hanger slides down the inclined forward side of the hump 49 by gravity, an associated fork 43 moves behind the hanger and pushes it toward the right along the support rail 41.

The space feeder section 21 further includes a plurality of injectors 51, 52, 53 and 54, each of which includes a downwardly inclined slick or support rail 56 and an injection mechanism 57, to be described in detail hereinafter. Above each injector mechanism is preferably provided a spacer device 55 which holds hangers and automatically releases them to the injector mechanisms 57. The lower ends of the inclined rails 56 terminate at the support rail 41 of the feeder section 21 adjacent track switches 58 of the rail 41. The switches 58 to be described hereinafter are normally open to permit hangers to drop on the rail 41, and they are automatically closed when it is necessary for a hanger to be pushed along the rail and over the switches. In the present instance, the distance between adjacent rails 56 and adjacent switches 58 is equal to the spacing of the forks 43, and each injector mechanism 57 may be associated with one of the disbursing stations of the removal sections 23 and 25. For example, if the injectors 51 to 54 are respectively associated with disbursing stations 1 to 4, an article injected on the rail 41 by a selected one of the injectors 51 to 54 ahead of the fork 43 associated with the disbursing station which is also associated with the selected injector mechanism will be transported to that disbursing station. Whenever a fork 43 is behind or upstream from its associated track switch 58, the associated injector 51 may be actuated to inject a hanger on the support rail 41. After a hanger is injected on the rail 41, it will be engaged by a fork 43, and moved toward the right across the rail 41 along with the hangers which were received from the first space feeder section 20.

Furthermore, since the spacing between the injectors 51 to 54 is substantially equal to the spacing between the forks 43, all four of the injecting mechanisms 57 may be energized simultaneously to inject hangers on the support rail 41. Simultaneous energization of the four injecting mechanisms 57 may be accomplished by a trip mechanism located, for example, at the position indicated by the letter "X" in FIG. 1, the trip mechanism preferably being constructed to be actuated by one of the forks 43. Since two series of four forks 43 each are provided, two of the forks 43 may be constructed to actuate the trip mechanism. The trip mechanism, to be described in detail hereinafter, is preferably constructed and mounted at a stationary location adjacent the moving chain 42 and, depending upon the construction of the injection mechanisms 57, may be either electrically or mechanically connected to the mechanisms 57. Simultaneous actuation of the mechanisms 57 is satisfactory where the spacing between adjacent injectors is equal to the spacing between the forks. However, in the event the spacing is unequal, or for any other reason, each of the forks 43 may be equipped with means to selectively energize the associated injector mechanism 57. Furthermore, it is not necessary that the number of forks 43 be an integral multiple of the number of disbursing stations. For example, an odd number of forks may be provided and simultaneous actuation of the injecting mechanisms 57 may be accomplished by a counter positioned to count the number of forks 43 passing by it. The counter may be constructed to count a predetermined number of forks, actuate the injector mechanisms 57, and then repeat the cycle.

The first lift section 22 includes an upwardly inclined support rail 61 which is connected to the rail 41 of the section 21 by a transfer rail section 62. The transfer rail section 62 also has an upwardly extending bulge 60 and the forks 43 of the feeder section 21 push the hangers up to the top of the hump 60 after which they slide downwardly to the rail 61 of the lift section 22. Associated with the rail 61 is another endless chain 63 having a plurality of forks 64 secured thereto. The chain 63 is trained around sprockets 65 and 66, the sprocket 66 being positively connected to sprocket 46 of the section 21 by still another chain 67, the teeth ratio of the sprockets engaged by the chain 67 preferably being such that the chain 63 moves at a considerably faster rate than the chain 42 of the section 21. If the speed ratio between the chains 42 and 63 is 1-to-4 the spacing between the forks 64 may be increased a proportional amount.

The function of the lift section 22 is to move the hangers from the level of the feeder sections 20 and 21 up to the level of the first removal section 23, which is shown in FIG. 1 as being at a higher level than that of the sections 20 and 21. It should be understood that the vertical height and the angle of inclination of the lift section 22 depends upon the vertical spacing of the sections 21 and 23, and that, if the sections 21 and 23 are at substantially the same level, the lift section 22 may be omitted.

At the top of the lift section 22 is another transfer rail section 69 having an upwardly extending hump 68, and the forks 64 of the section 22 move the hangers to the top of the hump 68, after which they slide downwardly to the lower removal section 23.

The removal section 23 comprises a generally horizontal support rail 71. Spaced along the length of the rail 71 are two disbursing stations 72 and 73, two injector stations 74 and 76, and a lower "out" station 77. Rail switches 78 are provided at the disbursing stations, a switch 78a is provided at the "out" station, and rail switches 79 (which may be similar to switches 58) are provided at the injector stations.

The upper removal section 25 is generally similar to the lower removal section 23, and comprises a support rail 81, two disbursing stations 82 and 83, two injection stations 84 and 86, and an upper "out" station 87. The rails 71 and 81 of the two sections 23 and 25 are connected by means of an upwardly inclined support rail 88 of the second lift section 24 and a downwardly inclined slick rail 89 connected to the upper end of the rail 88. Articles are moved toward the right along the rail 71 to the lower end of the lift rail 88 where they are moved upwardly to the slick rail 89, and the hangers then slide downwardly on the slick rail 89 to the beginning of the rail 81.

Associated with the three sections 23, 24, and 25 for moving the hangers along the rails 71, 88 and 81, is a single endless chain 91 having a plurality of forks 92 secured thereto at spaced locations along its length. The chain 91 is trained around a series of sprockets 93, 94, 96, 97, 98 and 99, the sprocket 98 being connected by still another chain 101 to be driven by a motor 102 and gear box combination 103. The sprocket 93 is adjacent the beginning of the rail 71 of the section 23 and is connected to the sprocket 65 of the first lift section 22 by another chain 104, the ratio of the sprockets preferably being such that the chain 91 moves at substantially the same rate as the chain 63. Since the motor 102 drives the chain 91, the two chains 91 and 63 are connected by the chain 104, the two chains 63 and 42 are connected by the chain 67, and the two chains 42 and 28 are connected by the chain 47, it will be apparent that energization of the drive motor 102 causes simultaneous movement of all of the chains at relative rates which are determined by the teeth ratio of the connecting sprockets. Furthermore, the relative positions of all of the pusher forks of the system will always be maintained because all of the chains are connected together.

While the forks 29, 43 and 64 of the sections 20, 21 and 22 respectively, extend only outwardly from the associated chains, the forks 92 fastened to the chain 91 extend both outwardly and inwardly from the chain 91. This is necessary because the chain 91 serves both the lower removal section 23 and the upper removal section 25. One end of each of the forks 92 moves the hangers along the lower removal section 23 while the other ends of the forks 92 move the hangers along the rail 81 of the upper removal section 25.

In general, the construction of the system is such that the hangers which are deposited on the feeder sections 20 and 21 are transported to the removal sections 23 and 25. To conserve space and make it easy for an operator manually to insert the hangers on the section 20, the length of the feeder section 20 is relatively short. For example, if ordinary garment hangers are being transported by the system, the distance between adjacent forks 29 of the section 20 is determined by the diameter of the wire stock from which the hangers are made, the thickness of the forks 29, and an additional clearance space to permit the hanger to be inserted between the forks 29. For relatively small diameter hangers and forks 29, the spacing between the forks 29 may be as small as one-quarter of an inch, which would permit forty-eight hook-receiving slots or spaces per foot. Therefore, a sitting operator with a reach of approximately three feet would have one hundred and forty-four such hook-receiving slots available to him. A standing operator having a range of a few steps could reach over a distance of approximately six feet and have two hundred and eighty-eight hook-receiving slots available to him.

The increase in space between the forks 43 of the second feeder section 21 permits automatic insertion on the second feeder section 21 by the injectors 51 to 54. The still further increase in space between the forks 92 of the removal sections 23 and 25 permits the disbursing stations to be spaced a considerable distance apart. With this system, therefore, one individual at the first space feeder section 20 may load hangers into the system and have them disbursed at widely spaced locations along the removal sections, resulting in a very efficient utilization of space and materials.

As a specific example, if the distance between forks 29 of the feeder section 20 is six inches from fork to fork, and if there are two complete fork series in the feeder sections 20 and 21 and in the removal sections 23 and 25, and if the speed ratio from the section 20 to the section 21 is 1-to-4, the speed ratio from the section 21 to the section 22 is 1-to-4, and the speed ratio from the section 22 to the removal sections 23 and 25 is 1-to-1, then the fork-to-fork distance of six inches at the first space feeder section 20 is increased to twenty-four inches from fork to fork at the second space feeder section 21 and is further increased to ninety-six inches at the sections 22, 23, 24 and 25. Consequently, the six inch distance between forks at the first space feeder section 20 is increased to eight feet between forks at the removal sections 23 and 25. Due to the fact that the ratio (which may, for example, be 1-to-6) of the fork speed to the fork spacing is constant throughout the sections, the spaces between the forks 29 of the feeder section 20 may be identified with certain disbursing stations at the removal sections, and a series of spaces which are thus identified is transferred to the second space feeder section 21 where additional injections may be made either manually or automatically. A series of spaces may thus be considered as being transferred from one section to the next. At the removal sections 23 and 25, the hangers, if any, located in an identified series of spaces are deposited at the disbursing stations 72, 73, 82 and 83.

In the construction shown in FIG. 1, the spacing between adjacent forks 92 is equal to the distance between the disbursing stations 72 and 73, which is also the distance between the disbursing stations 82 and 83. Therefore, when one of the forks 92 passes a predetermined location, for example, at the location indicated by the symbol X(1) in section 23, a trip mechanism may be actuated by that fork and the track switches 78 caused to open and permit hangers being pushed by the forks to be deposited at the disbursing stations 72 and 73. Similarly in the upper removal section, another trip mechanism at the location indicated by the symbol X(3) is provided, which is actuated by one of the forks 92 and causes track switches 105 associated with the disbursing stations 83 and 82 to be opened.

Track switches 106 are also provided along the rail 81 and are associated with the injector stations 84 and 86. If the dimensions of system are such that the forks 92 which are associated with the disbursing stations 82 and 83 approach those stations at the same time that the forks 92 associated with the disbursing stations 72 and 73 approach those stations, a single trip mechanism may be utilized to open all four rail switches 78 and 105 simultaneously, permitting simultaneous deposition of the hangers at the four stations. Furthermore, if the movements of the forks throughout the sections are properly synchronized, a trip mechanism in the feed section 21 may be used to open the rail switches 78 and 105.

The system shown in FIG. 1 may be used, for example, to transport finished articles from a loading station to a plurality of disbursing stations and distribute the articles at the disbursing stations. In a dry cleaning or laundry plant, for example, operators at the first space feeder section 20 may load cleaned and pressed garments hung on hangers on the first space feeder sestion 20 and on the injectors 51 to 54. Each of the disbursing stations 72, 73, 82 and 83 may be associated with an area served by one delivery man, and the stations 73, 72, 83 and 82 may be labeled Nos. 1, 2, 3 and 4, respectively. The operators loading the hangers at the feeder sections 20 and 21 sort the garments according to area when inserting them into the feeder sections. For example, if the designated area for a hanger or a group of hangers is served by the delivery man at disbursing station No. 1, the operators insert the hanger or hangers into the space in front of a fork labeled "1" and the garments are automatically moved to the disbursing station 73 where they may be picked up by the delivery man and loaded into his truck. The injectors 74, 76, 84 and 86 in such a system may be used by the delivery men to return hangers to the system.

In another method of operation, the disbursing stations 72, 73, 82 and 83 may serve the operators of pressing machines, for example, and the operators loading hangers carrying garments into the sections 21 and 20 may sort the garments according to type. For example, all trousers may go to an operator at disbursing station 72. After the operator at disbursing station 72 has pressed the trousers or performed whatever other operation he is assigned, he places the hangers on the injector 74 where they are returned to the system.

The operation of the injectors 74, 76, 84 and 86 is preferably automatic and is coordinated with the movement of the forks 92, and the injectors are preferably located along the rail downstream from the associated disbursing stations. The injectors include injecting mechanisms 107 which are actuated by solenoids 108, the solenoids 108 preferably being automatically energized at the same time that the rail switches for the associated disbursing stations are actuated, which may be accomplished by the same trip mechanism. In this case, the injectors inject hangers on the rails 71 and 81 ahead of the forks 92 identified with the associated disbursing stations but behind the next preceding fork. Hangers injected on the removal sections 23 and 25 are moved along the rails 71 and 81 by the forks 92 to the "out" stations 77 and 87. The hangers injected by the injectors 74 and 76 are dropped off at the "out" station 77. A trip mechanism at, for example, the location indicated by the symbol X(2) opens the track switch 78a for the "out" station 77. Similarly, the articles injected on the rail 81 of the upper removal section by the injectors 84 and 86 are moved along the rail 81 to the "out" station 87. Since this is the end of the system, a rail switch need not be provided at this point. If desired, the "out" station 77 and the associated track switch may be eliminated, or the same result could be obtained simply by keeping the track switch 78a closed so that hangers injected on the rail 71 by the injectors 74 and 76 would be moved to the upper removal section 25 and dropped off at the "out" station 87 along with hangers injected on the rail 81 by the injectors 84 and 86.

FIG. 2 illustrates a portion of an alternate form of the system, wherein the second lift section 24 and the upper removal section 25 are omitted, and a multiple or distributed "out" section 109 is substituted for the "out" station 77. In a system incorporating the structure shown in FIG. 2, an endless chain 110 replaces the chain 91 of FIG. 1 and is driven by a drive motor 111 and gear box 112 through a chain 115. The rail 71 is connected to a transfer rail section 113 having a hump, as previously described. A hanger moved to the top of the hump of the transfer section 113 by one of the forks on the chain 110 will slide downwardly to another rail 114 of the distributed "out" section 109. Associated with the rail 114 of the section 109 is another endless chain 116 which is trained around a pair of sprockets 117 and 118 and is connected by another chain 119 to be driven by the sprocket 94 and motor 111. The chain 116 carries a plurality of forks 121 which are identified or associated with certain of the forks on the chain 110. The forks 121 are spaced a distance apart which is generally the same as the spacing between a pair of disbursing stations 122 and 123 each having an associated rail switch 124, and hangers pushed by the forks 121 drop through the rail switches 124, when the latter are actuated, to the disbursing stations 122 and 123. To actuate the rail switches 124, a separate trip mechanism at the location, for example, indicated by the symbol X(4) may be tripped by one of the forks 121. However, if the positions of the forks 121 are properly coordinated with the positions of the forks on the chain 110, a single trip mechanism may suffice for both the section 23 and the section 109.

Thus, hangers injected at the injectors 74 and 76 are moved along the rail 71 by forks attached to the chain 110, transferred to the forks 121 of the section 109, and moved to the disbursing stations 122 and 123. In this construction, the disbursing stations 122 and 123 may be relatively close together, as compared with the distance between the injectors 74 and 76, which is the opposite of the relative spacing between the injectors and the disbursing stations described with regard to FIG. 1. The speed of the chain 116 must, of course, be correspondingly decreased as compared with the speed of chain 110 in order to maintain a constant speed to spacing ratio.

Since the system including the structure shown in FIG. 2 does not require the second lift section 24 or the upper removal section 25, the forks 121 may extend only outwardly from the chain 116, rather than extending in both directions from the chain as is true of the forks 92 shown in FIG. 1.

FIG. 3 illustrates a portion of a system wherein hangers may be injected onto the conveyor system using a lift conveyor section injector 130. The apparatus shown in FIG. 3 may be used, for example, where an operator at one level must insert hangers on a support rail 131 of the system, the rail 131 being located at a higher level than the operator. The system comprises the support rail 131 which has a plurality of gaps formed therein, the gaps normally bridged by track switches 135, and an endless chain 132 having a plurality of spaced pusher forks 133 secured thereto. The chain 132 is trained around a sprocket 134 and another sprocket (not shown) which may be similar to the sprocket 93 shown in FIG. 1. The sprocket 134 is connected to be driven by a suitable motor and gear box combination 136 to cause the chain 132 to move in a counter-clockwise direction as seen in FIG. 3 and to cause the forks 133 to sweep across the length of the rail 131 from left to right.

In the system shown in FIG. 3, only two identified series "1" and "2" are provided. Therefore, one or more feeder sections (not shown) similar to the sections 20 and 21 of the system shown in FIG. 1 may be connected to feed hangers to the rail 131 the feeder sections also having only two identified series. In FIG. 3, the two disbursing stations 137 and 138 are provided, and articles inserted into the system at the feeder sections are carried to the disbursing stations 137 and 138 and deposited there when track switches 135 are open. Certain of the forks 133, for example, the forks associated with the disbursing station 137, may be equipped with means for tripping the track switches 135 to cause them to open simultaneously. Since the spacing between the forks 133 is substantially equal to the spacing between the track switches 135, simultaneous opening of the track switches 135 ahead of the arrival of the associated forks will cause the hangers to drop through the switches 135 to the disbursing stations 137 and 138.

To inject hangers on the rail 131, the hangers may be manually inserted on an upwardly inclined support rail 141 of the lift conveyor section 130. An endless chain 142 is trained around a pair of sprockets 143 and 144 and has a plurality of spaced forks 146 secured thereto at spaced intervals, the forks 146 moving hangers deposited at a loading station 147 upwardly along the rail 141 to a downwardly inclined slick rail 148 where they drop onto the rail 131. The chain 142 and the forks 146 are caused to move by a drive connection between the sprocket 144 and a shaft 149. The shaft 149 is also connected to be driven by the motor-gear box combination 136 through a chain and sprocket arrangement 151 and gear box 152.

The rate of movement of the chain 142 is related to the rate of movement of the chain 132, and the spacing between the forks 146 is related to the spacing between the forks 133 such that a hanger deposited at the loading station 147 ahead of a fork associated with the disbursing station 137 will be moved by that fork upwardly and deposited on the rail 131 ahead of the fork 133 associated with the disbursing station 137. Similarly, articles placed at the loading station 147 ahead of the other of the forks 146 will be deposited on the rail 131 ahead of the forks 133 associated with disbursing station 138.

The hangers inserted on the rail 131 by the lift conveyor section 130 are moved from left to right along the rail 131 to a pair of "out" stations 153 and 154. Rail switches 155 associated with the "out" stations 153 and 154 are caused to open to permit the hangers to drop to the stations 153 and 154 the switches 155 being opened by a trip at the location X (6) which is actuated by a pin connected to one or more of the forks 133. Again, the spacing between the "out" stations 153 and 154 is made substantially equal to the spacings between adjacent forks 133 so that a single trip may be used to simultaneously open the rail switches 155 for both of the "out" stations 153 and 154.

In FIG. 4 is illustrated a portion of a system somewhat similar to that shown in FIG. 3 but including means for dividing or segregating the hangers removed at a disbursing station. The structure shown in FIG. 4 includes a rail 157 and an endless chain 158 having a plurality of forks 159 secured thereto at spaced locations along its length. The chain 158 may be mounted and driven similar to the chain 132 shown in FIG. 3. When a series of four disbursing stations is provided, as in the system shown in FIG. 1, two track switches 160 are provided in the rail 157, only one being shown in FIG. 4. Of the hangers pushed by each series of four forks, two hangers are deposited at a distributed disbursing station 161 which includes a rail 162 and an endless chain 163 connected by another chain 164 and a rotating shaft 166 which is driven from drive motor-gear box combination that drives the chain 158. A series of spaced apart forks 167 is fastened to the chain 163, and hangers dropped through the rail switch 160 associated with the station 161 onto the rail 162 are moved from left to right, as seen in FIG. 4, along the rail 162 by the forks 167. The rail 162 also has a pair of gaps formed therein which are normally bridged by rail switches 170 associated with a pair of disbursing stations 168 and 169. The rail switches 170 associated with the stations 168 and 169 are actuated to the open position to permit articles to drop off at the stations 168 and 169 by a separate trip mechanism at the location X (7), the trip mechanism being actuated by one or more of the forks 167.

The space between the speed of movement of the forks 167 is related to the spacing between and the speed of movement of the forks 159, and since the chains 163 and 158 are driven from a common power supply, certain of the forks 167 are permanently associated or identified with certain of the forks 159. In operation, a hanger having disbursing station 168 as its destination is moved along the rail 157 by a fork 159 and dropped through the track switch 160 which is associated with the distributed disbursing station 161. Every other one of the forks 167 is associated with the station 168, and one of these forks picks up the hanger on the rail 162 and moves it to the disbursing station 168. The other forks, not associated with the station 168, are associated with the station 169 and move hangers to this station.

If, as previously stated, a series of four disbursing stations are provided in the system of FIG. 4, the hangers for two of the disbursing stations are dropped at the distributed disbursing station 161 while the hangers for the other two disbursing stations are moved along the rail 157 beyond the distributed disbursing station 161 to another distributed disbursing station (not shown) which may be identical with the distributed disbursing station 161. A trip mechanism at location X (8), for example, may be actuated by every fourth fork 159 to open the switches 160, the switches 160 being held open long enough to permit the hangers pushed by two successive forks 159 to drop to the respective distributed disbursing stations.

FIG. 5 is a schematic diagram illustrating one mode of operation of a transporting system embodying the invention. The numeral 171 indicates an endless chain which is trained around a pair of sprockets 172 and 173 for movement, for example, in the counter-clockwise direction. The numeral 174 indicates a series of pusher arms or forks secured at spaced locations along the length of chain 171, and the entire length of the chain is divided into an integral number of fork groups or series, each series containing four forks. Every fourth one of the forks 174, indicated by the numeral 176, is equipped with a pin or other means for actuating a trip mechanism indicated by the numeral 177. The spacing between all forks 174 is equal and the total number of forks is an integral multiple of four. The forks 174 move along a generally horizontal support rail 178 the length of which is divided into a plurality of adjacent sections labeled, from left to right, A–1, A–2, A–3, A–4, A–5 and A–6. The length of each of the sections A–1 to A–6 is equal to the length of a series of four forks 174. At the intial section A–1 may be provided four feed stations 181; in section A–3 may be provided four feed stations 182; in section A–6 may be provided four release stations 183; and in section A–4 may be provided two feed stations 184. The feed and removal stations of each group are spaced a distance apart which is equal to the distance between forks, and the stations may be located in sections other than those described. In this construction, hangers may be injected at any one or more of the feed stations 181, 182 and 184 and all hangers so injected will be removed at the station 183, and all injections and removals are accomplished simultaneously each time the trip mechanism 177 is actuated by every fourth fork.

The return length of the chain 171 may also push hangers along another rail 185. Adjacent this length of chain may be provided a single feed station 186 and a single removal station 187, which are positioned four fork lengths apart. Therefore, a hanger injected at station 186 will be removed at station 187 each time the trip mechanism 177 is actuated. Groups of four feed stations 188 followed by four removal stations 189 may also be provided which are also operated simultaneously upon actuation of the trip mechanism 177. In addition, a single feed station 191 and a single removal station 192 may be provided in a space less than the distance between forks, which shows that the feed and removal stations need not be located in different sections.

Thus, a single trip mechanism may actuate a number of feed and removal stations simultaneously. One or more feed stations may feed garments to one removal station, and the number and spacing of the feed and removal stations may be varied to fit almost any operating conditions.

The system shown in FIG. 6 is somewhat similar to that of FIG. 5, and comprises a chain 196 having equally spaced forks 197, and two rails 198 and 199. The rails are again divided into sections, and a group of four removal stations 201 is provided, the stations 201 being located entirely in one section. A group of four adjacent feed stations 202 is also provided, but two of the feed stations 202 are located in one section and the other two feed stations are located in the adjacent section. Nevertheless, a single trip mechanism 203, actuated by every fourth fork 197, may serve to feed and release hangers simultaneously from the stations 202 and 201, respectively.

With the feed and removal stations located as shown in FIG. 6, if the trip mechanism 203 is moved a distance equal to one fork spacing, or if the trip pins on the forks 197 are moved to the next adjacent forks, the feed and removal stations will be in front of forks which are displaced from those in the operation described above.

On the return length of chain, an inclined feed rail 204 is provided which receives hangers simultaneously from a group of four feed stations 206. The hangers on the rail 204 are fed on the rail 199 sequentially by an injector mechanism 207, the operation of which is timed with the forks 197. On the rail 199 downstream from the rail 204 is a group of four removal stations 208 which remove hangers inserted by the injector mechanism 207. Thus, the stations 206 and 208 may be actuated simultaneously by a single trip mechanism 203, and the mechanism 207 may be timed with the movement of the forks 197.

In addition, a group of four feed stations 209 may be provided on the rail 199 and a single removal station 211 may be provided downstream from the feed stations 209. The stations 209 and 211 may operate simultaneously, and the station 211 may include a lower common rail (not shown) below the rail 199 onto which the hangers being pushed by four adjacent forks 197 may fall.

In FIG. 7 is shown a system generally similar to those of FIGS. 5 and 6, and including a chain 216 having forks 217, and two rails 218 and 219. A single trip mechanism 221 is provided which is actuated by every fourth fork. The rails are again divided into sections equal in length to four fork spacings. A group of four feed stations 222 is provided, located entirely in one section. Downstream from the stations 222, four removal stations 223, 224, 226 and 227 are provided, one of the removal stations being located in each of four adjacent sections of the rail 218. By this construction simultaneous actuation of all of the stations 222 to 224, 226 and 227 by a single trip mechanism still results in feeding and removal of hangers at the proper stations.

On the return length of the chain, the reverse of the above operation is shown. Four feed stations 228, 229, 230 and 231 are provided in adjacent sections of the rail 219, and four removal stations 232 are provided in a single rail section. Simultaneous actuation of the stations 228 to 232 again results in proper injection and removal of the hangers at the proper stations. Thus, by the arrangement shown in FIG. 7, variations in the spacing between the feed and removal stations may be obtained.

In FIG. 8, a system is shown including a chain 236 having forks 237, a rail 238, and a trip mechanism 239 adapted to be actuated by every fourth one of the forks 237. The chain and forks may be moved in either the clockwise or the counter-clockwise direction. The rail 238 is again divided into adjacent sections each equal to four fork spacings, and four feed stations 240 are provided in one rail section. When the chain 236 rotates in the counter-clockwise direction, the hangers injected at the stations 240 are moved to the right, and four removal stations 241 are provided which receive the hangers. Downstream from the stations 241 are four more feed stations 242. When the chain 236 is rotated in the clockwise direction, hangers inserted at the stations 242 are moved toward the left, and four removal stations 243 are located between the stations 242 and 241 for receiving the hangers. In this construction, a single trip mechanism 239 may simultaneously actuate all stations in either direction of travel.

Hangers injected at stations 240 may also be removed at stations 243 with chain movement in the counter-clockwise direction if the rail switches for the stations 241 are maintained closed and the rail switches for the stations 243 are designed, as hereinafter described, to accept hangers moving in either direction. The same also applies to the movement of hangers from stations 242 to stations 241. If the system has been operating with chain movement in one direction, the rail should be cleared of hangers before a reversal of chain movement and operation in the other direction. In addition to the foregoing methods of operation, it should also be understood that the locations of the feed stations 240 and 242 may be interchanged with the locations of the removal stations 241 and 243.

In FIG. 9 is shown a system wherein the spacing between adjacent forks is varied. The system includes an endless chain 246 having a first group of four forks 247, 248, 249 and 250, and a second group of four forks 252, 253, 254 and 255. The space between forks 247 and 248 is substantially equal to the space between the two forks 249 and 250, and the spacing between the forks 248 and 249 is considerably less than the previously referred to spacing. The system also includes a support rail 257, and four release stations 258, 259, 260 and 261 are provided along the rail 257, the spacing between adjacent release stations 258 to 261 corresponding to the spacing between forks 247 to 250.

Hangers may be injected on the rail 257 by feed stations (not shown) and as the hangers are being moved toward the right along rail 257 by the forks 247 to 250, simultaneous actuation of the release stations 258 to 261 when the forks 247 to 250, respectively, are just in front of the stations 258 to 261, drops the hangers to these stations. The fork 248 must be between the stations 259 and 260 when the release stations are actuated by a suitable trip mechanism (not shown) to insure removal of the hangers at the proper release stations.

Three additional release stations 263, 264 and 265 are provided along the rail 257, and the spacing between stations 263, 264, 260 and 265 are substantially equal. If release stations 258, 259 and 261 are not actuated (or are eliminated) and release stations 263, 264, 260 and 265 are opened simultaneously when the forks 248 and 249 are on opposite sides of the station 260 and are held open until a fork passes by it, hangers being pushed by forks 247 to 250 will be sequentially dropped off at stations 263, 264, 260 and 265.

The system of FIG. 9 is also provided with a second rail 269 having release stations 271, 272, 273 and 274 spaced therealong. The spacing between forks 252 to 255 is equal while the spacing between the release stations 271 to 274 is similar to the spacing between the forks 247 to 250. Thus, simultaneous and prolonged actuation of release stations 271 to 274 when fork 254 is between stations 272 and 273 again results in sequential dropping off of the hangers at the release stations 271 to 274.

In FIG. 10 is shown a system including a support rail 281, an endless chain 282 having a group of spaced forks 283, 284, 285 and 286 secured thereto, and a trip mechanism 287 positioned to be actuated by fork 283, for example. Four release stations 291, 292, 293 and 294 are provided along the rail 281. While the spacing between forks 283 to 286 is generally the same, the stations 291 and 292 are spaced relatively close together and at a considerable distance from stations 293 and 294, which are also spaced relatively close together.

The stations 291 to 294 are respectively associated with track switches 296 to 299 which are spaced distances apart which substantially correspond to the spacing between forks 283 to 286. Thus, if the switches 296 to 299 are opened simultaneously when the forks 283 to 286, respectively, are just in front of them, hangers pushed by the forks will simultaneously drop through the switches. The switches 296 and 298 are respectively located adjacent the stations 291 and 293 and therefore the hangers dropping through switches 296 and 298 may go directly to stations 291 and 293. Switches 297 and 299, on the other hand, are located ahead of the station 292 and 294, and lower support rails 301 and 302 are provided below the rail 281, which receive hangers falling through the switches 297 and 299. Hangers on the lower rails 301 and 302 are out of reach of the forks 283 to 285, and to move the hangers along the rails 301 to 302 to the stations 292 and 294, the last fork 286 of each group may have an extended portion 303 which is sufficiently long to engage hangers on the rails 301 and 302 and push them to the stations 292 and 294. By this system, there is a simultaneous release of hangers through the switches even though the release stations are spaced different distances apart.

If desired, a lower rail section 304 may be provided, which receives hangers dropping through all of track switches 296 to 299 and is connected to the station 291, so that all hangers may be pushed to station 291 by the projection 303 (when stations 292, 293 and 294 are eliminated).

While an endless chain is shown schematically in FIGS. 5 to 10 and both the feed and the removal stations are shown as being located on the endless chain, it should be understood that a plurality of connected sections may be provided as shown in FIG. 1, the movements of the chains of the separate sections being synchronized as previously described. Furthermore, although operation with only one trip mechanism on a section has been described, multiple trip mechanisms actuated by different forks may be provided to give greater flexibility in the selection of the spacing between forks and stations and also in the intermingling of the feed and release stations.

FIGS. 10 and 11 to 33 illustrate structural components for the system shown in FIG. 1.

*Rail structure and support frames*

The support rail and the pusher forks of the first space feeder section 20 may take the form shown in FIG. 10a. The latter figure shows a U-shaped support rail 310 having a hanger 311 suspended therefrom. Positioned above the rail 310 is an endless chain 312 comprising links 313 and 314 arranged in two parallel rows which are held in spaced apart relation by spacers 315, the links being pivotally connected together by pins 316. Some of the links have downwardly extended portions 317, and blocks 318 are secured between the portions 317 of laterally adjacent pairs of the links. A pusher finger 319' is secured to each block 318, each finger extending downwardly between the upwardly extending sides of the rail 310. Upon movement of the chain 312, hangers placed on the rail 310 are engaged by the fingers 319' and are moved along the section, as previously explained.

The support rails for some or all of the remaining sections shown in FIG. 1 may comprise a twin rail structure 319 (FIG. 11) including a pair of rails 320 and 321. The assembled length of the rails 320 and 321 is substantially equal to the length of the section of which it is a part, and the rails are preferably provided in standard lengths. The rails 320 and 321 are preferably secured together by forming an indented or offset portion 322 at standard intervals along the rail 321, for example, and forming holes 323 through both the indented portion 322 and the adjacent portion of the rail 320. Bolts 324 are positioned through the holes for securing the rails 320 and 321 together.

The twin rail structure 319 is supported at intervals along its length by means of a plurality of frames 326 (FIG. 11) which are adapted to be secured to suitable supporting structure such as a building (not shown) and are fastened to the rail structure 319 at the indented portions 322. Each frame 326 includes an angle 327 having a "standard" configuration. As will become apparent from the following description, a number of the structural components making up a system are designed such that they may utilize angles having the "standard" configuration of the angle 327 shown in FIG. 11. The standard angle 327 comprises an outer vertical portion 328, an upper horizontal portion 329, a lower horizontal portion 331, and an upturned end portion 332, these portions being integrally formed from a strip of metal bent to the configuration shown. The vertical outer portion 328 has a series of vertically spaced holes 333 formed therethrough which may be used, for example, for receiving bolts when the angle 327 is used to mount hook inserting or hook releasing mechanisms, as herein after described. The lower horizontal portion 331 is formed at a right angle to the vertical outer portion 328, and the upturned end portion 332 is formed at the end of the lower horizontal portion 331, the portions 328 and 332 being parallel. An elongated slot 334 is provided in the upturned end portion 332, and the rail structure 319 is secured to the angle 327 by inserting the end portion 332 into the pocket of one of the indentations 322 and passing the bolt 324 through the slot 334. The rail 321 is positioned such that the end portion 332 extends between the main body of the rail 321 and the indented portion 322, the portion 322 being offset an amount which is slightly greater than the thickness of the metal strip of the angle 327. The slot 334 is elongated so that the rail structure 319 may be vertically adjusted for the purpose of regulating the position of the rail structure relative to the pusher forks. Holes 336 may also be formed through the lower horizontal portion 331 for the purpose of fastening other components to the angle 327.

Depending upon the width of the rail structure 319 desired, the twin rails 320 and 321 may be fastened together in the manner described wherein the upturned end portion 332 of the angle 327 extends into the indented portion 322, or, if a slightly wider rail structure 319 is desired, the twin rails 320 and 321 may be positioned such that the upturned portion 332 is between the rail 320 and the indented portion 322. On the other hand, if a relatively narrow support rail is desired, two rails having the configuration of the rail 320 may be provided with the upturned portion 332 extending between the two rails, or two rails having the configuration of the rail 320 may be fastened directly together and the upturned portion 332 positioned at the outside surface of one of the two rails. If a very wide rail structure is desired, two rails having the configuration of the rail 321 may be positioned with the indented portion 322 adjacent each other, and the upturned portion 332 may be positioned either within one of the indented portions or between the indented portions of the two rails.

Thus, it can be seen that standardized rail sections having the configurations of the rails 320 and 321 may be connected together in a number of ways to meet numerous different requirements. A relatively wide rail structure is desirable because it holds the hangers in perpendicular planes relative to the rail structure. A thin rail contacts the hanger only at the uppermost section of the hook, and the hanger may pivot about such contact point. The wide rail structure described supports a hanger at two laterally spaced points, and such support helps to maintain the hanger perpendicular to the rail structure.

The frame 326 further includes a closure angle 337 which is secured to the angle 327 and is bent to form an enclosed space at the corner of the frame, which is between the vertical portion 328 and the horizontal portion 329. Components such as slide bar supports 338 and flexible cable supports 339, for example, may be positioned in the enclosed space and thereby secured to the frame.

At the outer end of the upper horizontal portion 329 is provided an angle 341 which is detachably secured to the portion 329, as by a bolt and nut combination (not shown). The frame 326 also supports a channel 342 which is mounted between the angles 337 and 341 and is secured thereto. The channel 342 has an opening 348 which faces downwardly, and the channel supports the lower section of an endless chain 344 having a series of wheeled carriages 343 (FIGS. 12 and 13) secured thereto at spaced locations along its length. Each carriage 343 has forks 346 and 347 secured thereto, which extend downwardly out of the opening 348 and adjacent the vertical outer sides of the rails 320 and 321.

On the upper side of the standard angle 327 is provided apparatus for supporting the return section of the chain 344 and the carriages 343 secured thereto. The latter apparatus comprises a second channel 351 having an opening 352 on the upper side thereof and a guide member 353 of nylon, for example, secured within the channel and at the lower side thereof. The rollers or pins connecting the links of the chain 344 ride on the upper surface of the guide member 353. Another guide member 354, similar to the member 353, is secured within the lower channel 342 at the upper side thereof. The guide member 354 is positioned above and between the links of the chain 344 and its lower surface is at a level such that the pins or rollers of the chain 344 are normally spaced a short distance below the lower surface of the guide member 354. As will be described hereinafter, the guide member 354 prevents excessive rise of the carriages as they push hangers, and it also prevents tilting movement of the carriages. The upper guide member 353, on the other hand, supports the upper or return section of the chain and the carriages attached thereto. Thus, the construction shown in FIG. 11 is suitable for use, for example, in the sections 21 and 22 of the system shown in FIG. 1, where only the lower section of the chain is utilized to push hangers.

To prevent dust and dirt from entering the interior of the channel 351 through the opening 352, a strip of tape 356 covering the opening 352 may be provided.

To provide for vertical or horizontal movements of the system, if this is desired, rollers 360 and 361 may be provided at the vertical sides of each frame 326, and the frames are not secured to and directly supported by the frame of the building. Each roller 360 and 361 is rotatably mounted on a shaft 362 which in turn is supported by U-shaped angles 363 and plates 364 secured to the opposite sides of the channel 351. The shafts 362 are arranged to support the rollers 360 and 361 for rotation about a common horizontal axis which is perpendicular to the rails 320 and 321. For horizontal movement of the system, a longitudinally extending travel channel 366 is provided at each side of the frame 326, the channels 366 receiving the rollers and supporting the system. The channels 366, of course, are secured to the supporting frame of the building. The rollers 360 and 361 are designed to ride longitudinally along the lower sides of the channels 366 when the system is moved in a horizontal plane. To obtain vertical movement of the system, a vertical travel channel 369 may be provided at each side of the frame 326, the channels 369 being secured to the building and being designed to receive the rollers 360 and 361 for guiding their movement in a vertical plane. The horizontal channels 366 may be arranged in vertically spaced pairs and the vertical channels 369 may be arranged in horizontally spaced pairs so that the conveying and sorting system can be moved to various locations for servicing a plurality of tiers of incoming or outgoing stations. Suitable power means (not shown) must, of course, be provided for lifting or lowering the system to the desired set of channels 366 and moving the system horizontally along the channels 366.

A power shaft 367 (corresponding to the shaft 149 or 166 of FIGS. 3 and 4) may have a bearing 368 supported on the frame 326 by means of a pair of angles 370 mounted on the angles 363.

*Carriage structure*

FIGS. 12 and 13 show in greater detail the carriage 343 and a portion of the chain 344. The chain 344 comprises two parallel rows of links 376 which are held in spaced apart relation by rollers 377. A series of pins 378 extend through holes formed at the ends of links 376 and through the rollers 377 and holds the parts of the chain in assembled relation. The links 376 and the rollers 377 are, of course, rotatable on the pins 378 so that the chain is somewhat flexible.

The carriage 343 comprises a left fork plate 381 and a right fork plate 382, the plates 381 and 382 being secured to a selected pair of laterally adjacent links 383 and 384 of the chain 344. Each link 383 and 384 is preferably constructed with a downwardly extending projection 386, each projection having a hole formed therethrough which receives a bolt 387 for the purpose of securing one of the fork plates thereto. Each of the fork plates 381 and 382 is formed with laterally inturned bottom, top, and side flanges 388 which extend adjacent the edges of the links 383 and 384 in order to lock the plates 381 and 382 in position on the links 383 and 384. If desired, a spacer 389 may be positioned between the plates 381–382 and the associated links 383–384. The leading edge 391 of each of the fork plates 381 and 382 may be substantially vertical (FIG. 13), or the leading edge may slant somewhat downwardly and forwardly from the chain 344, as desired.

The carriage 343 further includes a pair of rollers 392 and 393 secured to the plates 381 and 382, respectively, and receivable in the channels 342 and 351, as seen in FIG. 11. The rollers 392 and 393 are rotatably mounted on rivets 394 which are secured to the plates 381 and 382. As shown in FIG. 13, the common axis of the rivets 394 is in longitudinal alignment with the pins 378 of the chain 344.

With reference again to FIG. 13, it will be seen that movement of the chain 344 and the carriage 343 toward the left relative to the rails 320 and 321, with a hanger 400 positioned on the rails and in front of the forks, will cause movement toward the left of the hanger 400. However, the frictional drag of the hanger 400 on the rails 320 and 321 results in a tendency for the lower ends of the forks to shift rearwardly relative to the links 383 and 384 to which the fork plates are attached. Since the rollers 392 and 393 rest on the lower sides of the channel 342 and therefore cannot move downwardly, the tendency of the lower ends of the forks to shift rearwardly will cause the links 383 and 384 to tilt upwardly somewhat. Excessive rise of the chain links is prevented, however, by the guide 354 (FIG. 11) which limits the amount of upward movement of the chain due to its engagement with the rollers 377. Thus, the guide 354 serves not only to prevent tilting movement of the fork plates 381 and 382 but also to prevent an excessive amount of chain rise as well as preventing sidewise movement of the chain. The guide 354 is therefore advantageous since it eliminates the necessity for spacial channels for the rollers 392 and 393 designed to prepent undesirable tilting and rise of the carriages.

The carriage 343 may also be provided with one or more actuating fingers 401 in order to trip an actuating mechanism, as will be described hereinafter. As shown in FIG. 12, a finger 401 is secured, as by riveting, to the fork plate 381 and is in the form of an angle, one side of the angle extending outwardly from the outer surface of the fork plate 381. A number of actuating fingers may be provided, of course, on one or both of the fork plates 381 and 382.

In FIG. 14 is shown apparatus which may be used, for example, in sections 23, 24 and 25 of the system shown in FIG. 1. It will be recalled that in these sections, the pusher forks extend in both directions from the chains, and both ends of the pusher forks are utilized, in different sections, to push hangers along a support rail.

The rail shown in FIG. 14 may be identical with that shown in FIG. 11 and therefore the same reference numerals are used. Similarly, the angle 327, the angle 337, and the components enclosed by the closure angle 337 may also be identical with the corresponding components shown in FIG. 11 and again the same reference numerals are used. In place of the angle 341, a rectangular tube 406 may be provided which serves as a housing for electrical conductors or flexible cables, etc. A switch 407 may also be secured to the lower side of the tube 406, the switch 407 having a movable actuating arm 408 positioned to be engaged by an actuating finger, similar to the finger 401 of FIG. 12, of a carriage 409 as it moves past the switch 407. Wires from the switch 407 may extend through an opening 411 into the interior of the tube 406 and then to a rail switch or other component to be actuated, as will be described hereinafter.

The apparatus shown in FIG. 14 also includes a channel 412 generally similar to the channel 342 of FIG. 11 but having a greater internal height. The greater height is necessitated by the fact that the fork plates of the carriage 409 extend both upwardly and downwardly from the chain, thereby requiring a greater height within the channel.

The carriage 409 is generally similar to the carriage 343 of FIGS. 12 and 13, the only difference being that each of the fork plates 410 and 410a of the carriage 409 is extended upwardly, as well as downwardly, to form pusher forks 413 at the upper side of the carriage 409.

The apparatus shown in FIG. 14 is also provided with a guide 414 which may be made of nylon, for example, the guide 414 being secured to the lower end of a T-shaped bar 416. The top cross leg of the T-shaped bar 416 is positioned within and secured to the upper side of the channel 412, the vertical center leg of the bar 416 extending downwardly between the forks 410 and 410a of the carriage 409 and having the nylon guide 414 secured to its lower end. The guide 414 and the vertical leg of the bar 416 perform the function of the guide 354 (FIG. 11) in preventing tilting, rising and sidewise movements of the chain and the carriages attached thereto.

If it is desired to reduce the height of the channel 412, the upper and lower end portions of the fork plates may be hinged to the center portions, as shown in FIG. 15. The carriage shown in FIG. 15 comprises two fork plates 421 and 422 which are secured to a chain 423 as previously described. Rollers 424 and 426 are rotatably connected to the plates 421 and 422, respectively, for the previously described purpose. At the lower sides of the carriage are provided two pusher forks 427 and 428 which are hingedly connected to the lower edges of the plates 421 and 422. Similarly at the upper side of the carriage, two forks 429 and 431 are hingedly connected to the upper edges of the plates 421 and 422. Thus, in a system using the carriage in the position shown in FIG. 15, the lower forks 427 and 428 hang downwardly, due to the force of gravity, adjacent the vertical outer sides of the support rail structure and push hangers along the rails. At the same time, the upper forks 429 and 431 have swung outwardly to a substantially 90° angle relative to the plates 421 and 422. Thus, when a carriage of the type shown in FIG. 15 is used in the sections 23, 24 and 25 of FIG. 1, the lower forks 427 and 428 are operative to push hangers along the rails of the sections 23 and 24, while the forks 429 and 431 are in the positions shown in FIG. 15. When the carriage shown in FIG. 15 reaches section 25, the forks 429 and 431 swing downwardly to vertical positions due to gravity in order to push the hangers along the rail of the section 25. At the section 25, the forks 427 and 428 have swung outwardly to the position of the forks 429 and 431 as shown in FIG. 15.

While the forks 427 and 428 of the carriage shown in FIG. 15 are pushing a hanger along a support rail, there is little tendency for the forks 427 and 428 to swing upwardly about their hinge connections and thereby let the hanger slide by because when a hanger carrying a garment is being pushed by a carriage as shown in FIG. 15, the hanger tends to slant rearwardly slightly away from the uppermost portion of the hook. The diameter of the hook is sufficiently large to permit the lower ends of the forks 427 and 428 to extend slightly within the curvature of the hook, and therefore the hanger tends to lock around the outer sides of the forks 427 and 428. This is advantageous because the greater the rearward drag of a hanger on the pusher forks, the greater will be the locking force of the hook around the outer sides of the forks.

The hinged fork construction shown in FIG. 15 has other important advantages in addition to the space saving consideration heretofore mentioned. For example, by regulating the pivotal position of the hinged fork portions, it will be recognized that the forks can be selectively rendered operative or inoperative for conveying hooks along a rail section. Suitable arrangements of cams, wedges, solenoids, or the like may be provided at selected locations along the rail section for moving the hinged fork portions between their opposite pivotal positions, or the forks can be manipulated by the hand of the operator.

*Trip mechanism*

In FIGS. 16 and 17 is shown a mechanical trip mechanism which may be used in the system shown in FIG. 1 with the carriages shown in FIGS. 11 to 15. The structure shown in FIG. 16 includes a channel 436 which in this instance is similar to the channel 412, the channel 436 being secured to an angle 437 having the standard configuration of the angle 327 shown in FIGS. 11 and 14. Mounted between a closure angle 435 and the upper corner of the standard angle 437 are one or more slide bar supports 438 and 439, which are similar to the supports 338 shown in FIG. 11. The angle 437 further supports a rail structure 441 and an endless chain having a plurality of pusher forks 442 attached thereto, as previously described. Secured to a pusher fork 442 is an angle 443 having one or more actuating fingers 444 formed thereon.

Each slide bar support 438 and 439 has a longitudinally extending slot 446 formed therethrough. In the construction shown a slide bar 447 is positioned in the slot 446 of one of the supports. Secured to the slide bar 447 and extending downwardly therefrom is a trip support bracket 448. A contact arm 449 is pivotally connected to the bracket 448 by means of a pin 51, the pin 451 being arranged to pivot the arm 449 on a generally vertical axis and the contact arm 449 extending, when in an unactuated position, in a direction generally perpendicular to the support rail structure 441.

The contact arm 449 is an elongated member and is connected to the pin 451 relatively close to one of its ends. From the pin 451, the arm 449 extends toward the rail 441 and its outer end is in a position to be engaged by one of the actuating fingers 444 of the angle 443. The end of the arm 449 which is adjacent the pin 451 is formed as a cam surface 455 which slants forwardly and away from the rail structure 441.

Also connected to the bracket 448 is a torsion spring 452 which is mounted on a pin 453, the pin 453 in turn being secured to the lower edge of the bracket 448. One end of the torsion spring 452 is anchored to the bracket 448, as at 454, and the other end 456 of the spring 452 extends downwardly into a slot 457 formed in an edge of the contact arm 459 adjacent the cam surface 455.

The slide bar 447 and the bracket 448 are movable in a longitudinal direction, parallel to the rail structure, through the slot 446 formed in the slide bar support 438, and the bar 447 is normally held in an unactuated, or upstream position by, for example, a coiled tension spring 458. One end of the spring 458 may be secured to the upstream end of the slide bar 447, and its other end may be anchored to a stationary member, such as a frame 326 shown in FIG. 11.

Mounted underneath the closure angle 435 and secured thereto is a stationary spring release arm 461. The arm 461 extends from the angle 435 in the upstream direction, and the end of the arm 461, which is adjacent the contact arm 449, is sloped forwardly and away from the rail to form a cam surface 462. The spring release arm 461 may be secured to the closure angle 435 by means of a bolt which extends through a slot 463 formed through the arm 461. The slot 463 is preferably elongated so that its position may be longitudinally adjusted relative to the angle 435 and the contact arm 449. A resilient bumper 464 may be secured to the spring release arm 461 at a position where it is engaged by the downstream end of the bracket 448 in order to limit the extent of the downstream travel of the bracket 448 and the arm 447.

In the normal or unactuated position of the trip mechanism as shown in FIG. 16, the end 456 of the torsion spring 452 extends into the slot 457 of the contact arm 449 and holds the contact arm 449 in a perpendicular position relative to the rail structure 441. The slide bar 447 and the bracket 448 are held in the upstream position shown due to the action of the tension spring 458. In this position, the contact arm 449 and the spring 452 are spaced upstream from the cam surface 462 of the spring release arm 461.

When the pusher fork 442 is moved toward the left as seen in FIG. 16, due to movement of the endless chain, one of the fingers 444 on the pusher fork engages the adjacent end of the contact arm 449 and tends to move this end in the forward, or downstream, direction. Since the contact arm 449 is prevented from pivoting about the axis of the pin 451 by the engagement between the slot 457 and spring end 456, downstream movement of the pusher fork 442 pushes the contact arm 449, the bracket 448, and the slide bar 447 forwardly, the arm 449 still being in the perpendicular position relative to the rail structure. The spring release arm 461 is positioned relative to the contact arm 449 such that it extends over the arm 449 and to the left of the pin 451, as viewed in FIG. 16, and the slanted cam surface 462 engages the end 456 of the torsion spring 452. Continued downstream movement of the fork 442 and the contact arm 449 results in pressure on the end 456 of the spring 452 by the cam surface 462 which tends to push the end 456 out of the slot 457. Sufficient pressure on the spring end 456 moves it completely out of the slot 457, after which the contact arm 449 is able to pivot in a counter-clockwise direction about the axis of the pin 451, and the end 456 of the spring 452 rides outwardly on the cam surfaces 462 and 455, as shown in FIG. 17. The arm 449 pivots until its end which is engaged by the finger 444 moves past the finger 444. Once the finger 444 has moved out of engagement with the arm 449, the spring 458 draws the bracket 448 and the slide arm 447 upstream to the retracted position. At the same time, the end 456 of the spring 452 exerts pressure on the cam surface 455 of the contact arm 449 and swings the arm 449 back to the unactuated position where it is perpendicular to the rail structure. When the arm 949 reaches its unactuated position, the end 456 of the spring 452 snaps back into the slot 457 and holds the arm 449 in the unactuated position until the arm 449 is engaged by an angle attached to another pusher fork.

Thus, engagement between the angle 443 and the arm 449 causes forward movement of the slide bar 447 to a predetermined limit, this limit being determined by the position of the cam surface 462 relative to the arm 449 and the end 456 of the spring 452. After the slide bar 447 has been moved to its limit, it immediately snaps back to the unactuated position as previously explained. The slide bar 447 may be connected, either mechanically or electrically, to actuate various track switches and injector mechanisms, or both, of the system.

The two fingers 444 of the pusher angle 443 are shown in FIG. 16 as offset different distances from the center line of the rail structure 441 so that, for example, one of the two fingers 444 may engage the contact arm 449 of one trip mechanism, and the other of the fingers may engage the contact arm of another trip mechanism which is spaced along the track from the arm 449.

In FIG. 18 is shown a mechanical trip mechanism generally similar to that shown in FIGS. 16 and 17 but which differs therefrom in that the slide bar is held in the actuated position for a brief period of time rather than being immediately pulled back to the unactuated position. The trip mechanism shown in FIG. 18 comprises a contact arm 471, a pin 472 for pivotally mounting the arm 471, a bracket 473, and a spring 474, these members respectively corresponding in construction to the members 449, 451, 448 and 452 of the trip mechanism shown in FIGS. 16 and 17. In addition, the trip mechanism shown in FIG. 18 includes a generally L-shaped delay arm 476 which is pivotally mounted on the pin 472 below the contact arm 471, the delay arm 476 extending underneath the arm 471 and having substantially the same configuration as the arm 471. In adidtion, a stop plate 477 is secured to the rearward edge of the contact arm 471 and extends downwardly behind the rearward edge of the delay arm 476.

The trip mechanism further includes a spring release arm 478 which corresponds generally to the construction of the arm 461. The arm 478 is longer than the arm 461 and has a notch or slot 479 formed in its edge which engages the end of the spring 474.

In operation, a pusher angle secured to a fork contacts the outer end of the contact arm 471 and moves the contact arm 471, the delay arm 476, the bracket 473, and a slide bar (not shown in FIG. 18) secured to the bracket 473 toward the spring release arm 478 as previously explained. The rearward edge 481 of the arm 478 also has a slanted cam surface similar to the corresponding edge 462 of the arm 461, and engagement of the leading end of the spring 474 with the cam surface 481 moves this leading end of the spring 474 out of the slot formed in arm 471. The end of the spring 474 then rides along the outer longitudinal edge of the spring release arm 478 until the downstream end of the bracket 473 engages a bumper 482 fastened to the arm 478. Forward movement of the arm 471 then stops and continued movement of the pusher fork causes pivotal movement of the arm 471 until the pusher angle secured to the fork passes the end of the arm 471. A spring (not shown but corresponding to the spring 458 of FIG. 16) fastened to the rearward end of the bracket 473 then tends to pull the bracket 473 to the unactuated position. At the same time, the spring 474 snaps the contact arm 471 back to the perpendicular or unactuated position, and as the bracket 473 and the spring 474 start to move upstream, the leading end of the spring 474 catches in the notch 479 formed in the spring release arm 478. Such engagement of the spring 474 with the notch 479 holds the bracket 473 in the actuated position.

The outer end edge of the delay arm 476 adjacent the leading end of the spring 474 extends generally longitudinally when the delay arm 476 is in the perpendicular position, and when the contact arm 471 has snapped back to the perpendicular position due to the spring 474, the delay arm 476 is similarly returned to the perpendicular position.

Another pusher fork (not shown) following the fork which has engaged the arm 471 and moved the bracket 473 forwardly, as just described, is provided with a pusher angle which moves into engagement with the outer end of the delay arm 476 causing pivotal movement of the delay arm 476 about the pin 472. The end edge of the arm 476 which is adjacent the leading end of the spring 474 now engages the leading end of the spring and moves it out of the slot 479 formed in the spring release arm 478. Continued forward movement of the pusher fork pivots the delay arm 476 sufficiently to let the pusher angle pass, after which the bracket 473 and the arms are returned to the retracted or unactuated position.

Thus, the slide bar connected to the bracket 473 is moved to the actuated position by one pusher fork and is held in the actuated position until a subsequent pusher fork passes the trip mechanism. Therefore, a switch or injector device, for example, arranged to be actuated by downstream movement of the slide bar will remain in the actuated position for substantially the time required for the successive pusher forks to engage the trip mechanism. Such prolonged actuation may be useful, for example, when it is desired to open a rail switch ahead of the arrival of a hanger being moved along the rail and to hold the switch open until the hanger has passed through it.

*Inserter mechanism*

In FIGS. 19 and 20 is shown an apparatus for inserting a hanger on a track or rail structure. Such apparatus may be used in the sections 21, 23 and 25, for example.

The rail structure 485 again preferably includes two rails 486 and 487. A gap or switch opening 484 is formed in the rail structure 485, the switch opening being bridged by a bridging arm 488. The arm 488 may comprise an elongated strip of metal which is bent at, for example, approximately 45°, and the arm 488 is pivotally mounted by means of a pin 489 on the twin rail structure 485 at the upstream side of the opening 484. The arm 488 extends between the two rails 486 and 487 and has a bridging portion 491 which is long enough to bridge the opening 484 in the rail structure 485. In the embodiment illustrated in FIGS. 19 and 20, the arm 488 is freely pivotable about the pin 489 and its weight distribution is such that the arm is normally held by gravity in the full line bridging position shown in FIG. 19. However, spring means may also be provided for this purpose. When a hanger is being pushed along the structure 485 toward the left as seen in FIG. 19, which is the downstream direction, pusher forks 492 push the hanger onto the bridging portion 491 so that the hanger will cross the opening in the rail structure without falling through. When the portion 491 is in the horizontal position as shown in FIG. 19, its downstream end rests on a stop 493 positioned between the rails 486 and 487 at the downstream side of the opening 484. As hereinafter described, the downstream end of the arm portion 491 is liftable from the stop 493 to the dashed line position shown in FIG. 19 by the action of a hook being inserted onto the rail structure 485 at the gap 484. The fact that the arm 488 is normally in bridging position across the gap 484 makes it possible to provide for reverse travel of the pusher forks 492. However, it is also possible to provide spring means or the like for normally urging the arm 488 to its raised or open position in which case the hook itself being pushed along the rail structure 485 by the fork 492 causes temporary closing of the arm and bridging of the gap 484.

The rail structure 485 is supported by standard frames of the type previously described. Two frames are shown in FIGURE 19, a rearward frame 496 and a forward frame 497, and the rail structure opening 484 is located substantially midway between the two frames 496 and 497. The frames include standard angles 498 and 499, respectively, these angles having upturned ends which are positioned between the rails 486 and 487 and secured thereto in the manner previously described. The frames 496 and 497 further include a closure angle such as the closure angle 501 for the frame 497 shown in FIG. 19. Enclosed between the closure angle 501 and the standard angle 499 are a plurality of slide bar supports 502 and flexible wire supports 503. Further supported by the standard angles 498 and 499 of the frames are angle members 504 which are secured to the outer ends of the standard angles 498 and 499 and extend downwardly from these outer ends. As previously explained, the frames 496 and 497 are designed to support a channel 506 and a T-shaped guide bar 507 which supports a guide and an endless chain (not shown) having forks secured thereto as previously explained. The channel 506 may be secured to the standard angle 499 by means of bolts 508, and additional bolts 509 and spacers 511 may be provided between the channel 506 and the angle member 504 for the purpose of securing the angle member 504 to the channel 506.

The endless chain and the forks secured thereto and the structure for supporting the chain are similar to that shown in FIG. 14. However, it should be understood that this portion of the structure of FIG. 19 could be similar to the structure of FIG. 11 instead.

A hook inserter assembly 517 is supported by the frame 496 and is designed to insert hooks from the right of the support rail, when looking in the downstream direction. The hook inserter assembly 517 comprises a generally cylindrical rod 518 having an inclined central portion 519 which extends downwardly from a hook support storage rail 521 to approximately the bridging arm 488. The slope of the inclined portion 519 is such that a hanger positioned on the upper end of the inclined portion tends to slide downwardly by gravity. An angle of inclination of 15 to 20 degrees normally is sufficient for this purpose. The inclined portion 519 is preferably in a plane which is perpendicular to the axis of the rail structure 485. From its upper end, the inclined portion 519 slopes downwardly toward the rails 486, and 487 and at its lower end curves downwardly and away from the rails 486 and 487 to form another portion 520. At the lower end of the portion 520, the rod member 518 is bent in the upstream direction to form a horizontal mounting portion 522 which is generally parallel to the rails 486 and 487 and extends from the lower end of the portion 520 to the lower end of the angle member 504 of the frame 496. The end of the horizontal portion 522 adjacent the angle 504 is secured, as by welding, to a plate 523 which in turn is secured by means of bolts 524 to the angle member 504. The angle member 504 thus supports the rod 518. During the operation of the inserter assembly, hangers slide down the inclined portion 519, and the purpose of the portion 520 is to offset the horizontal mounting portion 522 sufficiently far from the lower end of the inclined portion 519 to permit the open side of the hook to slide off of the lower end of the inclined portion 519 without interference.

At the juncture of the two portions 519 and 520, a generally vertical slot 526 is formed in the side of the rod 518 which is adjacent the rail structure 485, and a support 527 for a pivotal arm 528 is secured to the rod 518 by pins 529. The support 527 may be made from flat stock which is positioned edgewise into the slot 526, and the pivotal arm 528 may be made, for example, from round heavy wire stock. One end of the arm 528 is turned down and is positioned within a hinge or bearing formed on the support 527, as by bending or curling a portion of the support around an end of the arm 528. From the support 527, the arm 528 extends downwardly at an angle toward the rails and its lower end rests between the two rails 486 and 487 on the stop 493, preferably at a location just downstream from the downstream end of the bridging arm 488. While the lower end of the pivotal arm 528 normally rests on the stop 493, the pivotal connection between the arm 528 and the support 527 permits the arm 528 to swing upwardly to the position shown in dashed lines in FIG. 19, which occurs when a hanger is being pushed over the bridging arm 488. In such circumstances, the hanger pushes the pivotal arm 528 upwardly and off to the side to the dashed line position as it passes, after which the pivotal arm 528 swings downwardly and again rests on the stop 493 due to the force of gravity. To obtain the pivotal movement of the arm 528 as described, the downturned pivot portion of the arm 528 and the bearing portion of the support 527 are at an inclined angle relative to a vertical plane, as shown in FIG. 20, so as to provide an inclined pivot axis for the arm 528. The inclined pivot axis extends generally upwardly and rearwardly with respect to the direction of movement along the rail structure so that the pivotable arm 528 is normally urged to closed position against the stop 493.

Although the pivotal switch arm 528 in FIG. 19 is shown as seating on the rail structure 485, it will be understood that an integral stop portion can be provided on the support 527 for coaction with the arm 528 to limit the downward position of the latter without reliance on seating engagement with the rail structure. Reference is made to my prior U.S. Patent No. 3,124,236 for a more detailed showing of such an arrangement.

To povide a smooth transition of a hanger from the portion 519 of the rod 518 to the pivotal arm 528, the upper edge portion of the support 527 extends outwardly from the slot 526 toward the rail structure and overlies the uppermost end of the arm 528, as at 531. The tip 532 of the extension 531 is further bent in the downstream direction at substantially the same angle as the angle of the pivotal arm 528 when the latter is in its normal position on the stop 493. Thus, a hanger sliding down the inclined rod portion 519 will slide onto the extension 531 of the support 527, onto the tip 532, and thence to the pivotal arm 528 from which it will slide onto the rails 486 and 487 just forward of opening 484 in the rail structure. As previously described, the bridging arm 488 is normally pivoted to the full line bridging position shown in FIG. 19, but the bent tip 532 and the angularly extending arm 528 cause the hanger hook to twist in a downstream direction as the hanger slides toward the rail structure 485 and the forward end portion of the hook engages the underside of the arm portion 491 and lifts the latter sufficiently to allow the hook to slide freely onto the rail at the downstream side of the gap 484.

The open side of a hanger hook traveling along the rail structure 485 should be toward the left when looking downstream in FIG. 19, and a hanger sliding down the portion 519 of the rod 518 should have the open side of the hook facing upstream as illustrated by the hook 530 in FIG. 19. As the hanger 530 slides through the inserter assembly, it twists or rotates as it moves over the support 531–532 and the arm 528 to bring the open side of the hook to the left of the rail structure when viewed in the downstream direction, as illustrated by hook 530' in FIG. 19.

If desired, a slanted hook control rail 536 may be mounted closely adjacent the inclined portion 519 of the rod 518. The rail 536 may be formed of relatively heavy wire stock and is held in place by a support arm 537 which extends rigidly from the angle member 504 to a position relatively close to the rod portion 519. The rail 536 extends generally parallel to the rod portion 519 and is located slightly above and to the left of the portion 519 as viewed in FIG. 19. The lower end of the rail 536 may be bent at substantially the same angle as the tip 532 of the support 527 and terminates closely adjacent the lower end of the tip 532. The rail 536 being laterally displaced to the left of the slide rail 519 insures angular twisting or rotation of the hanger hooks so that a hook 530' arriving at the gap 484 is oriented in edgewise fashion thereby providing more effective lifting engagement with the arm portion 491 and minimizing the required size of the gap 484 for insertion of hooks onto the rail structure.

The storage rail 521 at the upper end of the inclined portion 519 of the rod 518 preferably comprises a pair of rails 542 and 543 similar to the rails 486 and 487. An extension rail plate 546 having a forwardly projecting tip 547 is mounted at the end of the storage rail 521 between the rail members 542 and 543 and is secured thereto by a screw 544. The tip 547 extends over the upper end of the inclined portion 519 of the rod 518 to provide a smooth transition for hangers moving from the storage rail 521 to the portion 519 of the rod 518.

To selectively inject hangers on the support rail structure 485, means may be provided including a flexible cable, such as a Bowden wire 548. The Bowden wire 548 includes a movable wire 549 and a sheath 551, the sheath 551 being held stationary relative to the portion 519 of the rod 518 by means of a bracket 553 on a support portion 552 of the rod 518. From the upper end of the portion 519 of the rod 518, the rod 518 is bent to extend substantially vertically downwardly, then upstream from the portion 519, and then upwardly over the top of the portion 519 to form the support portion 552. The bracket 553 is secured, as by welding, to the portion 552 above the portion 519, and the sheath 551 of the Bowden wire 548 is positioned through a hole 554 formed through the bracket 553 and secured to the bracket 553 as by a set screw 556. The wire 549 terminates in a release point 557 which, when in an unactuated position, extends into a slight dimple or depression 558 formed in the upper surface of the inclined rod portion 519 adjacent the upper end thereof. Thus, a hanger moving off of the plate 546 onto the upper end of the inclined portion 519 of the rod 518 will slide downwardly along the portion 519 until it meets the release point 557, and the hanger will be held by this point until the release point 557 is retracted sufficiently to permit the hanger to slide downwardly along the portion 519 and onto the rail structure 485.

To actuate the release point 557, the Bowden wire 548 is mounted in one of the flexible cable supports 503. The sheath 551 of the assembly 548 is secured to the support 503, while the wire 549 extends therethrough and is connected to a slide bar 559 which may be identical with the slide bar 547 of FIG. 16 previously described. The wire 549 is connected to the slide bar 559 by means of a screw 562 affixed to the wire 549 and projecting through an upright bracket 561 mounted on the slide bar 559. A pair of nuts 563 are threaded on the screw 562 for adjustably retaining the latter on the bracket 561. The connection between the wire 549 and the bracket 561 is such that the screw and nut arrangement may be tightened after the wire 549 is in the proper adjusted position relative to the rod 518 and the slide bar 559. Actuation of the slide bar 559 and the wire 549 to release a hanger on the portion 519 of the rod 518 may be accomplished by means of a trip mechanism of the type shown in FIGS. 16, 17 and 18.

To permit insertion of hooks onto the rail structure 485 with the open sides of the hooks facing to the left instead of to the right as shown by hook 530 in FIG. 19, another inserter assembly may be provided adjacent the inserter 517, but in this case the pivotal arm corresponding to the arm 528 is inclined in an upstream direction and the rail switch corresponding to arm 488 is pivoted at the downstream side of the rail gap. Thus, when the hook is inserted onto the rail structure 485 it is moving in an upstream direction but its direction of travel is then reversed upon engagement by the pusher fork 492. With such a dual inserter arrangement, hangers can be inserted onto the rail structure with the open sides of the hook facing in either direction and with the pusher fork 492 moving in either direction.

In operation, movement of the forks 492 in the downstream direction in FIG. 19 causes hangers to be pushed along the structure 485 in the downstream direction. The bridging arm 488 is normally pivoted downwardly to the full line position shown in FIG. 19, and the forks 492 are thus able to push the hanger across the opening 484. The pivotal arm 528 of the hook inserter assembly is normally in the solid line position shown in FIG. 19 wherein its lower end rests on the stop 493. However, the hook of a hanger being pushed by the forks 492 engages the arm 528 pushing it upwardly to the dashed line position of FIG. 19. After the hanger has passed, the arm 528 swings downwardly to the stop 493.

When a hook is to be inserted on the rail structure 485 by the hook inserter assembly 517, the Bowden wire 548 is actuated, as previously explained, causing the release point 557 to retract. A hanger positioned on the portion 519 of the rod 518 and previously being held by the release point 557 then slides downwardly along the length of the portion 519 and onto the extension 531, the control rail 536 causing twisting of the hook. The hanger then slides off the tip 532 of the extension 531 onto the pivotal arm 528, and the forward end of the hook lifts the bridging arm 488 to the upwardly pivoted position of FIG. 19 to permit the hanger to slide onto the rail structure 485 downstream from the gap 484. The hanger then rests on the rail structure 485 at this position until the next set of forks 492 moves along the rails 486 and 487 and engages the hanger, thereby continuing the movement of the hanger along the rail structure 485.

Of course, actuation of the Bowden wire 548 must be coordinated with the positions of the pusher forks 492 so that a hanger will not be released at the same time that a pair of forks 492 is passing over the bridging arm 488 adjacent the hook inserter assembly 517. Such coordination or timed operation is easily accomplished because actuation of the Bowden wire 548 is obtained by movement of a fork past a trip mechanism as heretofore explained with regard to the structure shown in FIGS. 16 to 18. It will be understood that the inserter 517 may be operated to feed more than one hanger at a time onto the rail structure 485 if desired.

It will be recalled that the structure shown in FIG. 11 includes rollers and channels for vertically or horizontally moving the system. In such a system, having the hook inserter assembly 517 shown in FIG. 19, the rod 518 may move vertically or horizontally with the rail structure 485 and the frame 496, while the rail 521 may be stationary. The system would be positioned such that the upper end of the portion 519 is adjacent the rail 521 but not connected to it, thereby allowing the conveyor system to service any one of a plurality of storage or feed rails 521 arranged in horizontal rows and vertical tiers.

The construction could also be such that the rod 518 is stationary and supported by the rail 521, in which case the plate 523 and the portion of the rod 518 attached to plate 523 would be eliminated. The rod 518 would thus terminate just below the upper end of the portion 519. In the latter construction, it would be desirable to have the pivotal arm 528 normally in a raised position away from the rail structure 485 to permit movement of the rail structure without interference by the arm 528.

In FIG. 21 is shown a construction wherein such a pivotal arm is normally held upwardly away from the rail structure. The structure shown in FIG. 21 comprises a support bracket 576, which is generally similar to the support 527 shown in FIG. 19, and a pivotal arm 577, which is generally similar to the arm 528. A hinge 578 for the arm 577 is formed on the bracket 576 by bending or curling an edge of the bracket 576, the opening 579 formed by such bending being generally vertical and sufficiently large to receive a bearing portion 581 of the arm 577. The lower end of the portion 581 has a bead 582 which may serve to retain a coiled torsion spring 583 on the bearing portion 581 and to retain the portion 581 within the opening 579. One end of the torsion spring 583 is positioned in a slot 584 formed in the lower end of the portion 581, and the upper end of the spring 583 is bent at a right angle and positioned through an opening 586 formed through the support 576.

From the bearing portion 581, the arm 577 is bent at a substantially right angle, as previously explained, and extends over the upper edge of the portion 578 of the support 576. The upper edge of the portion 578 thus acts as a support for the arm 577, and the spring 583 is tensioned to urge the arm 577 to the position where the forward end of the arm 577 is pivoted upwardly away from the rail structure. When a hanger slides down the portion 519 of the rod 518 and onto the arm 577, the weight of the hanger is sufficient, relative to the strength of the spring 583, to pivot the arm 577 against the force of the spring 583 to the position where the forward end of the spring 577 rests on the stop 493 and the hanger then slides onto the rail structure.

A spring loaded normally open switch such as shown in FIG. 21 is also useful when it is desired to have a pair of inserter assemblies at opposite sides of the rail structure and both feeding into the same gap in the rail structure. Thus, hooks can be fed alternately from either inserter and the pivotal switch arm of the inserter closes only when a hook traverses the same.

Other types of hook inserters could be used with the present system. For example, a gravity inserter could be disposed in elevated position sufficiently above the rail structure 485 so that the hooks can drop onto the rail without the necessity of a gap in the rail structure. However, the use of a gap and a pivotal rail switch, as herein described, permits hooks to be inserted with the open portions of the hooks facing in either direction. In addition, the presently described arrangement allows compact positioning of the structures and minimizes the required length of the pusher forks.

*Hook release mechanism*

FIGS. 22 and 23 illustrate a hook release or drop off assembly for removing hangers from a rail structure. The assembly includes a rail structure 591 comprising two rails 592 and 593 of the type previously described and two frames 594 and 596 for supporting the rail structure 591, also as previously described. The frames further support a channel 597, a T-shaped bar 598 with an attached guide 599, a closure angle 601, slide bar supports 602, and flexible cable supports 600. The channel 597 supports an endless chain having carriage forks secured thereto, a portion of a pair of forks 603 being shown in FIG. 22.

The rail structure 591 is in two sections which are separated by an opening or gap, indicated generally by the numeral 604. The gap 604 is normally bridged by a vertically movable bridging arm 606 which has a longitudinally extending bridging portion 607 and a vertical support portion 608, the latter portion being fastened to the portion of the rail structure 591 which is on the downstream side of the gap 604.

The bridging arm 606 is mounted on the rail structure 591 by menas of a pair of laterally extending vertically spaced pins 609 which are secured to the portion 608 and extend into a vertically elongated slot 611 formed in the rail 592. The length of the slot 611 is such that when the lowermost of the pins 609 is resting on the lower edge of the slot 611, the portion 607 of the bridging arm 606 is substantially level with the upper edges of the rail structure 591 and the upstream end 612 of the portion 607 rests on a stop block 613 disposed between the rails 592 and 593 at the upstream side of the gap 604. On the other hand, when the uppermost of the two pins 609 is substantially at the upper edge of the slot 611, the portion 607 of the bridging arm is raised upwardly from the stop block 613 so that a hanger may move between the under side of the portion 607 and the upper edge of the rail structure 591 and drop through the opening 604.

The bridging arm 606 may be moved to the raised or actuated position by means of a lift arm 616 having a portion 615 which is pivotally mounted on a hinge 617, the hinge 617 in turn being mounted on a standard angle of the frame 596. The hinge 617 is secured to the standard angle by screws 618 which are positioned through longitudinally elongated slots 619 formed in the hinge 617. By making the slots 619 elongated, the position of the hinge 617 may be adjusted longitudinally on the frame 596 in order to properly position the parts. The pivot axis of the lift arm portion 615 extends laterally of the rail structure 591 adjacent teh downstream end of the bridging arm 606. Underneath the portion 608 of the arm 606, the lift arm portion 615 is bent upwardly and extends between the rails 592 and 593, as at 620, to engage the under side of portion 608 of the bridging arm 606. The other end of the lift arm 616 is bent upwardly and inwardly, as at 620', and is loosely engaged by a depending forked member 621. The member 621 is fastened to a slide bar 622' which is slidably mounted in one of the slide bar supports 602, and the two legs of the forked member 621 extend on opposite sides of the lift arm portion 620'. When the slide bar 622' and the forked member 621 are moved in the upstream direction relative to the frame 596 and the hinge 617, the upturned end portion 620 of the lift arm 616 swings in an arc in the upstream direction and downwardly, similar to the arcuate movement of the lift arm portion 620' which is engaged by the forked member 621. On the other hand, when the slide bar 622' is moved in the downstream direction, both ends of the lift arm 616 are swung upwardly and the bridging arm 606 is lifted upwardly, as shown in FIGS. 22 and 23.

The slide bar 622' may be actuated by a solenoid or by a mechanical trip mechanism of the type shown in FIGS. 16 to 18. In the event the type of trip mechanism employed does not include a delay mechanism designed to hold the bridging arm 606 in the upward or actuated position sufficiently long for a hanger to fall through the opening 604, such a delay may be obtained by means of a pivotally mounted forked member 622. One arm 623 of the forked member 622 extends between the two rails 592 and 593 underneath the portion 607 of the bridging arm 606, and the other arm 625 of the member 622 is positioned on the outside of the rail structure. In the construction shown, the arm 625 is positioned adjacent the outside vertical surface of the rail 592. Both arms 623 and 625 are secured to a pin 626 which in turn is pivotally mounted on a laterally extending axis on the rail structure. The forked member 622 is normally urged by a spring 628 to an upright position as determined by a stop pin 630 projecting rigidly from the rail 592. One end of the spring 628 is connected to the arm 623 at a location which is offset from the pin 626, and the other end of the spring 628 is fastened to a laterally extending pin 629 which is secured to the rails 592 and 593 upstream from the forked member 622. The spring 628 is relatively weak, and the weight of the bridging arm 606 is normally sufficient to hold the forked member 622 in a lower or unactuated position where the arms 623 and 625 extend generally horizontally. However, when the bridging arm 606 is raised, the spring 628 swings the arms 623 and 625 upwardly, and the arm 623 which is positioned between the two rails 592 and 593 extends upwardly underneath the bridging portion 607 and holds the bridging arm 606 in the raised position. Since the arms 623 and 625 are substantially vertical when in the actuated position, relatively little force is required to hold the arms 623 and 625 in this position. After a hanger has been pushed through the opening 604 by the forks 603, the bridging arm 606 being in the actuated or upward position, it will be understood that continued movement of the forks 603 past the opening 604 causes the fork 603 which is on the left when looking in the downstream direction to engage the arm 625 of the forked member 622 and swing the upper end of the arm 625 forwardly. Once the arms 625 and 623 are offset slightly from a vertical plane, the weight of the bridging arm 606 is sufficient to swing the arms 623 and 625 further downwardly and the bridging member 606 returns to the lower or unactuated position.

Thus, the forked member 622 serves as a delayed opening device since it holds the bridging arm 606 in the upward position, wherein the gap 604 is open to permit a hanger to drop through, until the pusher forks 603 pass by the bridging member 606. Therefore, the bridging member 606 may be raised or actuated well ahead of the arrival of the hanger and the fork 603, and the bridging member 606 will remain in the actuated position until the hanger has fallen through the opening.

In the event a trip mechanism having a built-in time delay of the type shown in FIG. 18 is provided, the fork member 622 and the spring 628 may be eliminated.

When a hanger is pushed through the opening 604, assuming that the bridging member 606 is in the actuated position, it drops onto a takeoff arm 631 which is pivotally mounted on the rail structure 591 between the rails 592 and 593 at the upstream side of the opening 604. The stop 613 has a hinge portion 632 formed thereon, as by bending or curling the downstream end portion of the stop 613 around an end of the arm 631, and the arm 631 is bent downwardly from the upper edge of the hinge portion 632 at, for example, a 15° angle from the horizontal. Furthermore, the hinge portion 632 is constructed such that the pivotal axis of the arm 631 is tilted somewhat from a vertical line, the tilt in the construction shown in FIG. 22 being toward the left when looking in the downstream direction from the rail structure 591. The tilt of the hinge axis causes the takeoff arm 631 to be normally drawn by the force of gravity to the position shown in full lines in FIG. 22 wherein its outermost end 633 is offset to the left of the rail structure 591 and engages a rod 634. From the end 633 of the arm 631 the rod 634 extends downwardly at, for example, a 10° to 15° angle, to a rail extension 636 which may be used for temporary storage of garments being carried by the hangers. The rod 634 is supported by the frame 594, the rod having mulitple bends and a terminal portion 635 secured to a fastening plate 637 which in turn is secured, as by screws 638, to the frame 596.

The portion of the rod 634 which is engaged by the end 633 of the takeoff arm 631 is preferably indented or grooved, as at 639, so that the end 633 of the arm 631 is recessed somewhat into the rod 634 to provide a smooth transition of a hanger from the arm 631 to the rail 634. Futhermore, the inclined pivot axis of the arm 631 permits the rod 631 to be pivoted to a position in which it extends substantially longitudinally of the rail structure 591, such pivotal movement being effected by the forks 603 as they pass the gap 604.

In operation, as a hanger is pushed toward the opening 604, either the fork 603 shown in FIG. 22 or some subsequent fork engages a trip mechanism (of the type shown in FIGS. 16 to 18) when the fork is a short distance upstream from the opening 604. Engagement of the trip mechanism cause downstream movement of the slide bar 622' which in turn causes swinging movement of the lift arm 616. Movement of the lift arm 616 causes upward movement of the bridging member 606 due to the engagement of the under side of the portion 608 by the inner end 620 of the arm 616, and when the bridging member 606 reaches the raised or actuated position, the spring 628 swings the forked member 622 to its upright position with the arm 623 extending generally vertically underneath the portion 607 and holding the bridging member 606 in the raised position. Subsequent deactuation of the trip mechanism permits the slide bar 622' and the lift arm 616 to return to the unactuated position, but the bridging member 606 remains in the raised position due to the action of the forked member 622. Thereafter, continued downstream movement of the forks 603 causes the hanger being moved by the forks to be pushed through opening 604 where the hook drops onto the bridging arm 631. Due to the downward slope of the arm 631, the hook slides rapidly along the length of the arm 631, off the forward tip 633 of the arm and onto the rod 634 and rail 636. As the fork arms 603 pass over the opening 604, the left-hand fork arm 603 engages the takeoff arm 631 and swings it forwardly, but by then the hanger is already off the arm 631 and, therefore, there is no interference with the hanger. Still further downstream movement of the fork 603 causes the fork arm which is on the left when looking in the downstream direction to engage the arm 625 and swing the arm 625 in the downstream direction, such movement permitting the bridging member 606 to fall to the lower or unactuated position. Subsequent pusher forks 603, moving other hangers which have as their destination other removal stations, move over the bridging member 606 which is now in lowered or unactuated position.

In FIG. 24 is shown an apparatus for actuating a bridging member, such as the member 606 shown in FIG. 22, and at the same time actuating, for example, a hook inserter assembly. The structure shown in FIG. 24 comprises a frame having a standard angle 641 and a closure angle 642, which are identical with the corresponding members of the frames previously described. Between the closure angle 642 and the adjacent corner of the standard angle 641 are mounted a solenoid 643 and a flexible cable support 644. The solenoid 643 includes electrical conductors 646 for connection with a power supply and a solenoid plunger 647 which is designed to move substantially in the longitudinal direction upon energization of the winding of the solenoid 643. Loosely connected to the upstream end of the plunger 647 is a lift arm 648 which is pivotally mounted on a hinge 649 affixed to the angle 641, the members 648 and 649 corresponding to the lift arm 616 and the hinge 617 shown in FIG. 22. Upon energization of the solenoid 643, the plunger 647 moves in the downstream direction and swings the lift arm 648 in order to raise a bridging member (not shown) at a hook release station, as described with regard to FIGS. 22 and 23.

The solenoid plunger 647 further includes an extension 651 which extends downstream from the frame and has adjustably connected thereto a bracket 652. The cable support 644 has mounted thereon a cable including a sheath 653 which is secured to the support 644 and a flexible wire 654 which extends through the sheath 653 and is adjustably connected to the bracket 652 in the same general manner heretofore described in connection with FIG. 22. Thus, the bracket 652 may be longitudinally adjusted relative to the extension 651 of the solenoid plunger and relative to the wire 654. A tension spring 656 is connected between the bracket 652 and the housing of the solenoid 643, and the spring 656 normally urges the bracket 652, the plunger 651, and the wire 654 longitudinally in the upstream direction. Thus, energization of the winding of the solenoid 643 causes movement in the downstream direction of the plunger 647 and the wire 654, and upon deenergization of the solenoid winding, the tension spring 656 returns the plunger 647 and the wire 654 to their unactuated or upstream positions. The wire 654 of the flexible cable may be connected, for example, to actuate a hook inserter assembly, and may thus form part of the flexible cable 548 shown in FIG. 19. Such a hook inserter assembly is preferably located downstream from a hook release station which is actuated by the lift arm 648 and the solenoid 643. In such a system, energization of the solenoid 643 simultaneously lifts a vertically movable bridging member at a hook release station, as described with regard to FIGS. 21 and 22, so that a hanger may be pushed by the forks through the opening of the hook release station, and simultaneously, the flexible cable 653 connected to a downstream hook inserter assembly inserts a hanger on the rail structure downstream from the hook release station. Therefore, the same pusher fork that pushes a hanger through the opening of a hook release station can later pick up another hanger at the downstream hook inserter assembly.

The solenoid 643 may be energized by a trip mechanism of the type shown in FIGS. 16 to 18. For example, an electrical switch may be mounted on a closure angle 438 shown in FIG. 16 adjacent the slide bar 447, and a switch actuating arm may be fastened to the slide bar 447 and positioned to turn on the switch when the slide bar is moved in the downstream direction, as previously described.

With reference again to FIGS. 22 and 23, while the hook release assembly is shown as taking hangers off toward the left when looking in the downstream direction, it should be understood that similar apparatus may be located at the right of the rail structure. In such an assembly, of course, the hinge portion 632 of the member 613 must be bent to cause the takeoff arm 631 to normally fall to the right rather than toward the left.

*Roller chain and fork structure*

The foregoing description has dealt with a system employing endless chains, wheeled carriages fastened to the endless chains, and pusher forks formed on the wheeled carriages. In the construction shown in FIGS. 25, 26, 27, and 28, the system is designed to utilize a roller type chain wherein selected links of the chain have integral extended portions which form pusher forks. The constructions to be described may also be used in the systems shown in FIGS. 1 to 10 of the drawings.

The structure shown in FIG. 25 comprises a frame 670 including a standard angle 671 and a closure angle 672, similar to the corresponding members previously described. Located between the closure angle 672 and the adjacent corner of the standard angle 671 are a solenoid 673, having a longitudinally movable plunger 674, and a slide bar support 676. On the opposite side of the standard angle 671 may be provided a hollow conduit 677 which is generally rectangular in cross section and which may house electrical conductors used in the system. Fastened to the under side of the conduit 676 in this instance is a switch 678 having a pivotally mounted switch actuating arm 679 positioned to be engaged and actuated by a finger 711 (FIG. 26) of a pusher fork.

The frame 670 further supports a rail structure 681 comprising a pair of parallel, longitudinally extending rails 682 and 683 which are spaced apart and secured to the standard angle 671 in the manner previously described. A T-shaped rail insert 684 is preferably included in the rail structure 681, the cross or horizontal portion of the T overlying the upper edges of the rails 682 and 683, and the vertical portion of the T extending downwardly between the two rails 682 and 683. The rail insert 684 may be made of nylon, for example, and may be secured to the two rails by means of rivets 687.

The endless chain comprises two parallel rows of links 691 and 692 (FIGS. 25 and 26), the links of each row being positioned in longitudinal alignment and being pivotally connected by means of pins 693. The pins 693 also serve to connect the two rows of links together, and a roller 694 is rotatably mounted on each pin 693. At spaced intervals along the track, laterally adjacent pairs of links have portions which extend upwardly and downwardly from the central or main body of the links and form upper and lower pusher forks 696 and 697, respectively. The lower forks 697 straddle the nylon insert 684 and the vertical sides of the rail structure 681, and the upper forks 696 extend upwardly adjacent the vertical sides of a guide 698 which, for example, may also be made of nylon. The guide 698 is secured as by means of screws 699 (FIG. 26) to the underside of a generally square channel 701 which is supported by the frame 670. The channel 701 has a longitudinally extending opening 702 on its top side which may be covered with a strip of tape 703 to prevent dirt from entering the interior of the channel. Within the channel 701 above the guide 698 is mounted another guide 704 which may be fastened to the channel 701 by means of screws 707 (FIG. 26). Thus, the lower section of the chain, which is the portion that pushes the hangers along the rail structure 681, is supported by the rail insert 684 while the return section of the chain rests on and is supported by the upper surface of the guide 704. The guide 698 prevents lateral movement of the chain relative to the rail structure 681 and it also prevents tilting movement of the chain relative to the rail structure. Still further, the guide 698 prevents excessive rise of portions of the chain due, for example, to the chain tending to move upwardly as it moves forks along the rail structure 681.

As shown in FIGS. 25 and 26, a hanger 710 being moved along the rail structure 681 is positioned on top of the rail insert 684 between the upper surface of the rail insert and the underside of the chain. The rail insert thus serves as a support for both the hanger 710 and the chain. The frictional drag of the hanger 710 on the rail insert 684 causes the links having the forks 696 and 697 formed thereon to tilt upwardly and rearwardly so that the roller 694 at the upstream end of these links rises slightly but the amount of the rise is limited by the guide member 698.

The forks 696 and 697 may have fingers or pins secured thereto for the purpose of actuating switches or trip mechanisms as previously explained. For example, the pin 711 is formed on the upper pusher fork 696 and extends toward the right, when looking in the downstream direction, in a position to actuate the switch arm 679 (FIG. 25). In addition, fingers 712 may be fastened to the upper pusher forks 696 on the left, when looking in the downstream direction, in position to engage and actuate a trip mechanism of the type shown in FIGS. 16 to 18.

*Modified rail structure for hook insertion and release*

Since the chain in FIGS. 25 and 26 is designed to ride along the upper edge of the rail structure, it is not possible to insert a hanger directly onto the upper surface of the rail structure by means of the hook insertion assembly shown in FIG. 19, but the modified rail structure shown in FIG. 27 may be used with the hook insertion means of FIG. 19.

The construction shown in FIG. 27 comprises a rail structure 716 including a pair of parallel rails and a rail insert 717 positioned between and at the upper edges of the rails. The rail structure 716 is supported by frames 718 and 719, only portions of which are shown in FIG. 27 and an opening or gap, indicated generally by the numeral 721, is formed in the rail structure 716. Positioned above the upper edge of the rail structure 716 is a guide 722 which is generally similar to the guide 698 previously described and an endless roller chain 723 having pusher forks 724 formed integrally on the chain links at spaced intervals is positioned on the rail structure 716. As previously described, the pusher forks 724 extend along the vertical sides of the rail structure 716 and the guide 722, and the rail structure and the guide cooperate with the forks 724 to prevent the chain 723 from sliding sidewise or tilting relative to the rail structure 716.

The construction shown in FIG. 27 assumes movement of the chain 723 and the pusher forks 724 fastened thereto from left to right as seen in FIG. 27. The portion of the rail insert 717 on the upstream side of the opening 721 includes an extension 726 which extends substantially over the opening 721 and terminates at the point indicated by the numeral 727. The vertical leg of the T-shaped rail insert 717 is cut away from the extension 726 from the point 727 upstream to the upstream side of the opening 721, and the end edges 730 of the rails of the structure 716 at the upstream side of the opening 721 are tapered downwardly and upstream. An opening formed in the rail insert 717 extends from the point 727 to the point indicated by the numeral 728 at the downstream side of the opening 721. Between the two points 727 and 728 is positioned a slide bar 729 which is slidably mounted on the rail structure 716 for movement in the longitudinal direction. The slide bar 729 has laterally extending pins 731 secured thereto, the pins 731 preferably extending laterally in both directions from the slide bar 729, and the pins 731 being positioned within longitudinal elongated slots 732 formed in the rails of the rail structure 716, adjacent the upper edges of the rails. By this arrangement, the slide bar 729 is permitted to move longitudinally an amount which is determined by the longitudinal length of the slots 732.

The slide bar 729 has two positions, namely, an unactuated position shown in full lines in FIG. 27, and an actuated position shown in dashed lines in FIG. 27. In the unactuated position the upstream end of the slide bar 729 abuts the rail insert extension 26 at the point 727, and in the actuated position the upstream end of the slide bar 729 is spaced from the point 727, as indicated by the numeral 733. In both the actuated and the unactuated positions of the slide bar 729, the downstream end of the slide bar 729 is spaced from the point 728, as shown in FIG. 27. The slide bar 729 is normally urged to the unactuated position by a torsion spring 734 which is mounted on a pin 736 secured to the rail structure 716. One end of the torsion spring 734 is anchored on the frame 719 and the other end of the spring 734 engages the downstream end of the slide bar 729, and the tension on the torsion spring 734 is such that the spring urges the slide bar 729 longitudinally in the upstream direction.

The portion of the rail structure 716 at the downstream edge of the opening 721 and underneath the extension 726 is recessed to form a ledge 741 which is spaced below the upper surface of the rail structure 716. At the downstream side of the ledge 741, the rail structure 716 is inclined upwardly as at 742, to a point 733 at the upper edge of the rail structure 716. Thus, when the slide bar 729 is in the actuated or downstream position, a hanger positioned on the ledge 741 may be moved in the downstream direction and pushed upwardly along the inclined portion 742 through the gap formed between the two points 727 and 733 and onto the upper surface of the slide bar 729.

A hanger may be positioned on the ledge 741 by means of apparatus of the type shown in FIG. 19. In FIG. 27 a portion of the hook insertion assembly is shown, including a pivotal arm 743 that is swingably mounted on a support 744. The members 743 and 744 correspond in construction to that of the members 528 and 527, respectively, as shown in FIG. 19. The principal difference is that the lower end of the rod 743, when in its normal downward position, rests on a pin 746 at the ledge 741, whereas the lower end of the arm 528 shown in FIG. 19 rests on a stop 493 which is at the upper level of the rail structure. Thus, the hook insertion apparatus shown in FIG. 27 is designed to deposit hangers on the ledge 741 below the upper edge of the rail structure 716, whereas the hook insertion apparatus shown in FIG. 19 is designed to insert hangers on the upper edge of the rail structure. The hinge mounting of the arm 743 on the support 744 also permits the arm 743 to swing upwardly to the dashed line position shown in FIG. 27, when a hanger and pusher fork pass by.

In operation, a hanger 745 is deposited by the hook insertion apparatus prior to the arrival of the pusher forks 724. A hanger so inserted slides down the support 744 and the arm 743 and comes to rest on the ledge 741. Subsequently, the pusher forks 724 engage the hanger 745 on the ledge 741 and move the hanger toward the right. Initial downstream movement of the hanger causes it to engage the vertical upstream end edge 747 of the slide bar 729 and push the latter in the downstream direction against the force of the torsion spring 734, thereby opening the gap between the points 727 and 733. Continued downstream movement of the pusher forks 724 push the hanger upwardly along the inclined portion 742 and onto the upper surface of the slide bar 729. Once the hanger has reached the upper surface of the slide bar 729, the torsion spring 734 is able to return the slide bar 729 to its normal unactuated position, and the pusher forks 724 continue to push the hanger along the surface of the slide bar 729. Eventually, the hanger slides off the downstream end of the slide bar 729 and on to the upper edges of the rails, and subsequently the hanger is pushed on to the upper surface of the rail insert 717.

Thereafter the movement of the hanger continues until the hanger reaches the proper disbursing station, as hereinafter described in connection with FIG. 28.

The rail structure 716, including the ledge 741, may be used in a system of the type shown schematically in FIG. 10, the rail structure 716 providing the main body of the rail structure and the ledge 741 providing the lower or recessed portions 302 and 301 shown in FIG. 10.

The hanger release construction shown in FIG. 28 may be considered a continuation of the structure shown in FIG. 27, and therefore the same reference numerals are used for corresponding parts. The rail structure 716 has another opening or gap 751 formed therein which is normally bridged by a slide bar 752. The bar 752 is mounted between the twin rails of the rail structure 716, the rail insert 717 in the vicinity of the bar 752, of course, being eliminated. A plurality of laterally extending pins 753 are formed on the vertical sides of the slide bar 752, and the pins 753 extend into longitudinally elongated slots 754 formed in the twin rails adjacent the upper edges thereof. Thus, the slide bar 752 is capable of movement between an upstream or unactuated position wherein the pins 753 are at the upstream ends of the slots 754, and a downstream or actuated position wherein the pins 753 are adjacent the downstream ends of the slots 754. At the downstream end of the slide bar 752, a torsion spring 756 is mounted on a laterally extending pin 757 attached to the rail structure 716. One end of the spring 756 is anchored on a frame 758 of the assembly, and the other end of the spring 756 engages the downstream end of the slide bar 752. The tension on the spring 756 is such that the spring 756 normally urges the slide bar 752 longitudinally in the upstream direction to close the gap 751.

To open the gap 751 by moving the slide bar 752 upstream against the force of the spring 756, a slide bar actuating arm 759 is provided which is similar to the lift arm 616 shown in FIG. 24. The arm 759 is pivotably mounted on a hinge support member 761 which in turn is supported by the frame 758, and a generally vertically extending portion of the actuating arm 759 extends upwardly between the twin rails of the rail structure 716, the upper end of the arm 759 terminating just below the lower surface of the slide bar 752. An angle 762 is secured to the bar 752 by means of a rivet or screw 763, the angle 762 having a downwardly extending arm which is positioned to be engaged by the actuating arm 759 upon pivotal movement of the arm 759 in the clockwise direction as seen in FIG. 28. Such pivotal movement of the arm 759 causes it to engage the downwardly extending arm of the angle 762 and push it and the slide bar 752 in the upstream direction against the force of the torsion spring 756.

Pivotal movement of the actuating arm 759 may be obtained by means of the structure including the slide bar 622 and the bracket 621 shown in FIG. 24, movement of the slide bar 622 being obtained as previously described with regard to the operation shown in FIG. 24.

If it is desired to hold the slide bar 752 in the actuated position for a short period of time, a delay device may be provided also. The delay device comprises a member 766 which is pivotally mounted on a laterally extending axis by means of a pin 767, the pin 767 being mounted on the rail structure 716 and the member 766 being positioned between the twin rails and underneath the slide bar 752. The weight distribution of the member 766 is such that the greatest proportion of its weight is toward the left of the pin 767, as viewed in FIG. 28, with the result that the member 767 and the pin 767 tend to pivot in the counterclockwise direction as seen in FIG. 28. A leaf 768 is secured by means of a set screw 769 to the downstream end of the member 766. From the member 766, the leaf 768 extends upwardly and its upper edge is in sliding engagement with the under side of the slide bar 752 upon downstream movement of the slide bar 752. A notch 770 is formed in the underside of the bar 752, and the notch 770 is located such that the upper end of the leaf 768 may extend upwardly and catch in the notch 770 upon movement of the slide bar 752 in a downstream direction to the actuated position. When the leaf 768 extends into the notch 770, the slide bar 752 is prevented from returning to the upstream or unactuated position.

To close the gap 751 after actuation of the slide bar 752, an arm 771 is secured to the outer end of the pin 767, on the outside of the rail structure 716. The arm 771 extends upwardly when the leaf 768 is in the notch 769. Therefore, after the pusher fork 724 has passed the gap 751, it engages the arm 771 and pivots the pin 767 and the member 766 secured thereto in the clockwise direction as seen in FIG. 28. Such pivotal movement causes the leaf 768 to swing downstream and downwardly out of the notch 769, after which the torsion spring 756 returns the slide bar 752 to the downstream position. After the pusher fork 724 passes the arm 771, the weight distribution of the member 766 tends to pivot the pin 767 and the leaf 768 in the counterclockwise direction, and the upper edge of the leaf 768 again engages the under side of the slide 752.

Hangers dropping through the gap 751 from the rail structure fall on a pivotal arm 772 which is swingably mounted on a hinge bracket 773, the bracket 773 in turn being secured to the rail structure 716 at the upstream side of the gap 751. The hinge axis of the arm 772 is slanted in the manner previously described with regard to the operation of the arm 631 shown in FIG. 24, and in its normal position the lower or downstream end of the arm 772 rests on a rod 774 which is generally similar to the rod 634 shown in FIG. 24. The hinge mounting of the arm 772 also permits the arm 772 to be pivoted to a generally longitudinal position when it is engaged by a hanger and pusher forks moving in the downstream direction.

In operation, assume that the chain 723 and the pusher forks 724 are moving in the downstream direction and pushing a hanger along the upper surface of the rail insert 717 of the rail structure 716. Prior to the arrival of the hanger and pusher forks 724 at the gap 751, the slide bar actuating arm 759 is actuated, in the manner described with regard to FIG. 22, so that the slide bar 752 is moved downstream to the actuated position. As soon as the movement of the slide bar 752 is sufficient for the notch 770 to pass the leaf 768, the weight distribution of the member 766 causes pivotal movement of the leaf 768 into the notch 769 to hold slide bar 752 in the actuated position with the gap 751 open. Thereafter, continued movement of the hanger and the pusher forks 724 in the downstream direction causes the hanger to drop through the gap 751 and onto the pivotal arm 772, which is sloped to cause the hanger to slide downwardly onto the rod 774, where it continues to slide to, for example, a storage position. Thereafter, continued downstream movement of the pusher forks 724 causes the lower end of one of the pusher forks 724 to engage the upper end of the release arm 771 and pivot the pin 767 and the leaf 768 in the clockwise direction sufficiently far for the leaf 768 to become disengaged from the notch 770, thereby permitting spring return of the slide bar 752 to its unactuated position wherein the gap 751 is closed.

In the event a pusher fork pushes a hanger along the rail structure 716 and the slide bar 752 has not been moved to the actuated position, the hanger is pushed over the upper surface of the slide bar 752 and does not fall through the gap 751. The hanger moving past the gap 751 swings the arm 772 in the generally longitudinal position as previously described and as shown in dashed lines in FIG. 28. Movement of the hanger continues in the downstream until it arrives at the disbursing station to which it has been designated.

If desired, the longitudinal ends of the slide bar 752 and the adjacent ends of the rail inserts 717 may be slotted or dovetailed so that depressions or sharp edges do not exist at the junctions of the slide bar 752 with the rail inserts 717.

Hanger injector

FIG. 29 shows an apparatus for injecting hangers, either automatically one at a time or one at a time each in response to an actuating signal. The structure, which is shown schematically in FIG. 29, comprises a twin support rail structure 781 of the type previously described which is supported, for example, by a frame structure 782. The rail structure 781 is positioned at an inclined angle of, for example, ten to twenty degrees, which is sufficient to cause a hanger positioned on the rail structure 781 to slide downwardly from right to left as seen in FIG. 29. At the upper end of the rail structure 781 may be provided a rod 783, and hooks positioned thereon slide downwardly to the rail structure 781 and to an injector unit 784. Further downstream along the rail structure 781 from the injector unit 784 is a second injector 786, and at the lower end of the rail structure 781 is a slick rail 787. The structure shown in FIG. 29 may be provided, for example, to feed hangers one at a time to a hook insertion assembly of the type shown in FIG. 19.

The injector unit 784 comprises a frame 788 which supports a stop member 789, the latter member having a stop surface 791 formed thereon. The surface 791 extends upwardly between the twin rails of the structure 781 and is slanted rearwardly, or upstream, at a slight angle so that hangers positioned on the rail structure 781 above the injector unit 784 will slide downwardly and be caught by the stop surface 791. A top rail 792 is preferably positioned just above the rail structure 781 and generally parallel thereto, the lower edge of the top rail 792 being spaced above the upper edge of the rail structure 781 a distance slightly greater than the diameter of the stock from which the hangers are made. The main function of the top rail 792 is to prevent hangers from rising upwardly off of the rail structure 781 when a group of hangers are bunched at the stop member 789.

The hangers held by the surface 791 may be lifted over the member 789 by means of a lift bar 793 which is mounted for generally vertical movement on the stop member 789. At the lower end of the lift bar 793 is a cam follower surface 794 which receives a cam 796 secured to a pivotally mounted, laterally extending rod 797. Pivotal movement of the rod 797 in the clockwise direction, as seen in FIG. 29, causes upward movement of the cam 796 and consequently upward movement of the lift bar 793. The upper end of the lift bar 793 is slanted and engages the under side of the hanger which is against the surface 791, and the upward movement of the lift bar is sufficient to cause the hanger to be lifted over the upper corner of the surface 791. Both the upper edge of the lift bar 793 and the upper edge of the stop member 789 slant downwardly and downstream, and therefore a hanger lifted upwardly over the upper corner of the surface 791 immediately slides downwardly over the upper edge of the stop member 789 and along the upper edge of the twin rail structure 781.

Downstream from the injector unit 784 and mounted on the structure 781 are a series of spacer levers, three being shown in this case at 798, 799 and 801. At the lower end of the lowermost spacer lever 801 is the second injector unit 786 which also includes a stop member 802, a lift bar 803, and a cam member 804 secured to a pivotally mounted rod 806. The operation of the injector unit 786 is similar to the operation of the unit 784, and upward movement of the lift bar 803 causes a hanger positioned against the stop 802 to be moved upwardly and over the upper corner of the stop 802, after which it slides downwardly along the twin rail structure 781 to the rail 787.

The injector unit 786 also includes a support 807 for the members 802, 803, and 806 and also for an actuator or trigger 808 for the injector unit 786. The actuator 808 includes a pivotally mounted rod 809 having secured thereto a right angle member 811, one end of member 811 extending downwardly in front of the lift bar 803, and the other arm of the member 811 extending generally in the downstream direction and having a weight 812 secured to the end thereof. The pivotally mounted rod 806 is caused to rotate by means of a solenoid which is energized when the member 811 is pivoted to a proper position, as will be described hereinafter.

The spacer lever 801 is pivotally mounted on the rail structure 781 by means of a pin 813, the pin 813 extending laterally and the spacer lever 801 being positioned between the twin rails of the structure 781. The spacer lever 801 includes an elongated arm 814 which extends downstream from the pivot pin 813 to a point adjacent the stop 802 and the lift bar 803 and a weighted portion 815 upstream from the pivot pin 813 and having a stop 816 formed at its upper edge. When a hanger resting on the rail structure 781 is against the stop member 802, it also rests on the lower or downstream end of the arm portion 814 of the lever 801 and prevents the member 801 from pivoting in the clockwise direction as seen in FIG. 29. The lever 801 is normally urged in the clockwise direction by its weight distribution. When the lever 801 is so held by a hanger, the stop 816 extends upwardly sufficiently far above the upper edge of the rail structure 781 to prevent a hanger from sliding along the rail structure 781 past the stop 816. However, once the lift bar 803 has moved upwardly and removed the hanger from the stop 802, the actuating lever 801 is permitted to pivot in the clockwise direction and the stop 816 lowers sufficiently to permit the hanger previously held by it to slide downwardly along the rail structure 781 to the stop 802. It will be seen, therefore, that the lever 801 serves to hold the hanger at the stop 816 until the preceding hanger has been lifted over the stop 802 by the lift bar 803.

Positioned upstream from the spacer lever 801 is the spacer lever 799 which has a construction similar to the lever 801. The lower or downstream end of the lever 799 extends downstream past the stop 816 and over the pivot pin 813. The lever 799 is also pivotally mounted by a pivot pin 817 and has a stop 818 which is constructed to prevent a hanger from moving past it when another hanger is being held by the stop 816 over the downstream end of the lever 799.

The spacer lever 798 also has a construction similar to the levers 799 and 801, and it is pivotally mounted by means of a pivot pin 819 and it also includes a stop 821. The lower or downstream end of the lever 798 extends downstream past the stop 818 and rests on the pin 817. As will be described hereinafter, the spacer levers 798, 799, and 801 may be positioned in side-by-side relation between the twin rails of the rail structure 781, so that they do not interfere with each other.

Thus, it will be seen that the arrangement of spacer levers permits the articles to be held in any desired spaced relation for intermittent feeding to the lowermost injector 786. By varying the length of the spacer levers, any desired spacing between successive articles can be maintained. In addition, the spacer lever arrangement can be used separately and not in conjunction with the injector.

In the operation of the construction shown in FIG. 29, assume that a hanger is positioned on the rail structure 781 against the stop 802 of the second injector unit 786. The weight of the hanger over the downstream end of the lever 801 is sufficient to prevent pivotal movement of the lever 801. Therefore, a second hanger positioned on the rail structure 781 will slide downstream until it meets the stop 816 of the lever 801 and will be thereafter held by the stop 816. The hanger being held by the stop 816 is also over the downstream end of the lever 799 and this hanger prevents pivotal movement in the clockwise direction of the lever 799. Therefore, still another hanger inserted on the support rail structure 781 will slide downstream until it meets the stop 818 and will thereafter be held by the stop 818 since the lever 799 cannot pivot in the clockwise direction. The hanger being held by the stop 818 is also over the downstream end of the lever 798 and prevents the lever 798 from pivoting in the clockwise direction. Therefore, still another hanger inserted on the rail structure 781 will slide downstream until it engages the stop 821 of the lever 798 and will thereafter also be held.

The first injector unit 784 includes a switch actuator arm 826 which is positioned to be engaged by the hanger being held by the stop 821, and when a hanger is at the stop 821, the switch (not shown), which is actuated by the arm 826, is turned off. When there is not a hanger at the stop 821, the arm 826 is pivoted, as by means of a spring, to the dashed line position shown in FIG. 29 where it turns on the switch of the injector unit 784 and causes pivotal movement of the rod 797, which action, as previously explained, causes upward movement of the lift bar 793 thereby lifting a hanger over the stop 789 after which the hanger slides downwardly to the stop 821. The hanger then at the stop 821 holds the switch of the injector unit 784 in the off position until it is removed.

Actuation of the solenoid of the second injector unit 786 causes pivotal movement of the rod 806 and lifting of the hanger at the stop 802 upwardly and over the stop. As soon as the hanger at the stop 802 has been lifted upwardly, it releases the downstream end of the spacer lever 801 and permits the lever 801 to pivot slightly in the clockwise direction. Such pivotal movement of the lever 801 lowers the stop 816 and permits the hanger formerly held by the stop 816 to slide downwardly along the rail structure 781 to the stop 802. Movement of the hanger away from the stop 816 also permits subsequent pivotal movement, in the clockwise direction, of the spacer lever 799 and release of the hanger formerly held by the stop 818. A similar action then repeats for the hanger formerly held by the stop 821 of the lever 798. As previously explained, as soon as a hanger is released by the stop 821, the arm 826 is turned to actuate the switch of the injector unit 784 and inject another hanger past the stop 789. Thus, after each actuation of the second injector unit 786, each hanger on the rail structure 781 moves downstream to the next position and is then held until a subsequent actuation of the injector unit 786.

The injector unit 786 may be actuated manually to cause a hanger to be dropped on the rail 787 when desired, or the injector unit 786 may be actuated by movement of a pusher fork past a trip mechanism of the type shown in FIGS. 16 to 18, as previously explained. Still further, the injector unit 786 may be actuated by the arm 808 which causes hangers to be repeatedly inserted on the rail 787 as long as there are hangers on the support structure 781. In one mode of operation, the arm 808 is designed to turn the switch on when a hanger is being held by the stop 802 and to hold the switch turned on until the hanger has moved upwardly above the upper edge of the stop 802 by the lift bar 803. Once the hanger is above the upper edge of the stop 802, however, the switch is turned off until the hanger has cleared the stop 802 and is at the lower end of the rail structure 781. After the hanger has moved out from underneath the end of the arm 808, the switch arm 808 pivots in the counter-clockwise direction as seen in FIG. 29 due to the weight 812, and the lower end of the arm 808 swings toward the right until it engages the next hanger sliding downwardly along the rail structure 781. As soon as the next subsequent hanger reaches the stop 802, the switch for the unit 786 is again turned on to raise that hanger upwardly for injection on the rail 787. Thus, the switch for the unit 786 will be alternately turned on and off as the hangers are moved along the slide rail 781 to the stop 802 and pushed over the upper edge of the stop 802 to the slide rail 787.

Although the injector device of FIG. 29 has been described in connection with an operation wherein one hanger at a time is fed by the injector units 784 and 786, it will understood that by increasing the upper contact area of the lift bars 793 and 803, a plurality of hangers can be injected each time the injector units are actuated.

FIG. 30 shows in greater detail the structure of the injector unit 786 and a portion of the rail structure 781. The pin 809 which pivotably mounts the switch arm 808 has a cam 831 secured thereto which is positioned to engage an actuating arm 832 of a switch 833. The switch 833 is connected to control energization of a solenoid 834 which in turn has its vertically movable plunger 836 pivotally connected to a forked member 837 rigidly secured on the pivot rod 806. A torsion spring 838 is provided to urge the forked member 837 and the plunger 836 in the downward direction as seen in FIG. 30.

FIG. 31 shows in greater detail the structure of the spacer levers 799 and 801. The downstream end 814 of the lever 801 is positioned laterally adjacent the lift bar 803 and between the twin rails of the structure 781. As previously explained, a hanger resting on the upper edges of the twin rail structure 781 and against the stop 802 will be over the downstream end 814 of the lever 801 and, therefore, will prevent the lever 801 from pivoting about the pin 813. Similarly, a hanger being held by the stop 816 of the lever 801 will be positioned over the downstream end of lever 799 and accordingly will prevent the lever 799 from pivoting about the axis of the pin 817. As shown in FIG. 31 the levers 799 and 801 have offset portions 839 and 840, respectively, which permit the levers to extend in side-by-side relation between the twin rails of the structure 781 without interference.

FIG. 32 shows a modified form of the structure shown in FIGS. 30 and 31. The structure shown in FIG. 32 also includes a top rail 841 (similar to the rail 792) and a support rail structure 842 including twin rails 843 and 844. Instead of pinning the spacer levers directly to the rails 843 and 844, the lever 846, which may be similar to one of the levers 798, 799, and 801, is pivotally mounted on a U-shaped bracket 847 by means of a pin 848. The bracket 847 is fastened to the rails 843 and 844 by turning the upper edges of the bracket 847 outwardly and downwardly over the upper edges of the rails 843 and 844, the bracket 847 being positioned between the rails 843 and 844. In FIG. 32, a portion 849 of the next adjacent spacer lever, in the upstream direction, is also shown resting on the upper surface of the pin 848.

An advantage of the structure shown in FIG. 32 over that shown in FIGS. 30 and 31 is that it is a relatively easy matter to remove a spacer lever from the support rail structure for servicing or replacement. All that is necessary is to lift the U-shaped bracket 847 upwardly out of engagement with the rail structure 842.

FIG. 33 shows still another form of the injector apparatus wherein some of the spacer levers are mounted above the support rail for the hanger. The structure shown in FIG. 33 includes a lower support rail structure 851 which may be a twin rail of the type previously described and is supported by a series of frames 852, 853, and 854. Mounted on the frames 852 to 854 and above the rail structure 851 is an upper rail structure 856 which may be similar in construction to the lower rail structure 851. A series of three spacer levers 857, 858, and 859 are pivotally mounted by means of pins 861 to 863, respectively, on the upper rail structure 856 in longitudinally spaced relation, the levers 857 and 858 having extended portions which are positioned underneath the pins 862 and 863, respectively. Each of the spacer levers 857 to 859 also includes a stop portion 865 to 867, respectively, which extends downwardly below the lower edge of the upper rail structure 856.

Hangers 868 and 869 are shown adjacent the stops 865 and 866, respectively. It will be noted that the upper ends of the hangers 868 and 869 appear to be raised above the upper edge of the rail structure 851. This is due to the curvature of the hangers and the width of the rail structure 851. The center or uppermost portion of each hanger is disposed above the upper edge of the rail structure 851, and the uppermost portion of the hook is sufficiently high to be engaged and held by the stop portions 865 and 866 of the levers 857 and 858 in the positions shown.

The hanger 869 being held by the stop portion 866 of the lever 858 is also underneath the extended portion of the lever 857 and therefore prevents pivotal movement in the counter-clockwise direction of the lever 857 about the pin 861. By preventing the lever 857 from pivoting in counterclockwise direction, the hanger 868 is held at the position shown by the stop portion 865 of the lever 857. However, once the lever 858 is permitted to pivot in the counterclockwise direction, the hanger 869 is no longer engaged and held by the stop portion 866 and it slides down the inclinded rail structure 851. Once the hanger 869 clears the downstream end of the lever 857, the lever 857 is also permitted to pivot in the counterclockwise direction and thus release the hanger 868. The hanger 868 will slide only so far as the stop member 866, however, because the hanger 869 previously held by the stop portion 866 will then have moved downwardly beneath the downstream extension of the lever 858. If the hanger 869 is then held by the stop portion 867 of the lever 859, the hanger 869 will then be underneath the downstream extended portion of the lever 858 and will hold the lever 858 in the position shown. The hanger 868 will then be at the position formerly occupied by the hanger 869 and will be held by the stop portion 866. Another hanger subsequently injected on the support structure 851 will then be held by the stop portion 865 of the lever 857.

Downstream from the levers 857 to 859 is another spacer lever 871, which has a construction similar to the levers 857 to 859, and which is mounted on a laterally extending pin 872 for pivotal movement on the lower rail structure 851. The lever 871 also includes a stop portion 873 which extends upwardly above the upper edge of the lower rail structure 851 and into the space between the two rail structures 851 and 856. At the lower or downstream end of the lever 871 is a release point 873a which may be similar to the point 557 described with regard to FIG. 19. The point 873a may be the end of the flexible wire of the Bowden wire, the sheath of which is secured to the downstream end of the upper rail structure 856. When the release point 873a is in the downward or unactuated position, it holds a hanger 874 at a position on the rail structure 851 where it is over the downstream end of the lever 871 and thus prevents pivotal movement, in the clockwise direction, of the lever 871 about the axis of the pin 872. In the position of the lever 871 shown, the stop portion 873 is in a position to catch and hold a hanger sliding downwardly on the rail structure 851 toward the release point 873a. When a hanger is so held by the stop portion 873, it holds the downstream extended portion of the lever 859 in an upwardly displaced position where the stop portion 867 of the lever 859 extends downwardly into the space between the two rail structures 851 and 856 and also holds a hanger.

Once the release point 873a is actuated to release the hanger 874, the hanger 874 slides downwardly along the rail structure 851. The lever 871 is then free to pivot in the clockwise direction thereby releasing a hanger previously held by the stop portion 873. Such a hanger then slides along the upper edge of the lower rail 851 and, assuming that the release point 873a has returned to the lowered position shown in FIG. 33, the hanger released by the stop portion 873 will be caught by the release point 873a and the lever 871 will again be held in the position shown. However, in the period of time when the lever 871 was pivoted in the clockwise direction and the hanger previously held there was sliding downstream, the lever 859 will also have been permitted to pivot in the counterclockwise direction and permit the hanger previously held by the stop portion 867 to slide downstream to be engaged by the stop portion 873 and held until the next actuation of the release point 873a. Similarly, a hanger being held by the stop portion 867 prevents pivotal movement of the lever 858 in the counterclockwise direction so that the hanger 869 is prevented from moving downstream. However, as soon as the hanger previously held by the stop portion 867 moves downstream away from the downstream portion of the lever 858, the lever 858 is free to pivot in the counterclockwise direction and release the hanger 869. Similar operation is then effected for the lever 857 and the hanger 868. Thus, for each actuation of the release point 873a a hanger is permitted to slide downstream from the release point 873a along the lower support rail 851 and all of the hangers along the lower rail structure 851 will advance one position.

If there are no hangers being held by the levers 857 to 859 and lever 871 but the release point 873a is in the downward position shown, a hanger inserted onto the lower rail structure 851 will slide rapidly past the levers 857 to 859 in succession and also past the stop portion 873 of the lever 871 to the release point 873a. The same rapid movement of a hanger will also occur in the structure shown in FIG. 29, where a hanger will slide rapidly downstream along the rail structure 781 when there are no other hangers on the rail structure 781 to hold the spacer levers in positions where they will engage and retard downward movement of a subsequent hanger.

I claim:

1. A transporting system comprising a feed section including a plurality of feed section elements at spaced locations along said feed section for moving articles therethrough, the spacing between said feed section elements permitting the injection of articles therebetween, a distributor section connected to receive said articles from said feed section, said distributor section comprising a plurality of spaced apart distributor section elements for moving articles therethrough, means for moving said feed section elements and said distributor section elements, the ratio of spacing to speed of said elements being the same for each of said sections at all times, a plurality of disbursing stations at spaced locations along said distributor section for receiving articles being moved by said distributor section elements, and actuator means responsive to the movement of the elements of one of said feed and distributor sections for causing said articles to be simultaneously released at said disbursing stations.

2. A system as in claim 1, wherein said actuator means is located on said distributor section.

3. A system as in claim 1, wherein said actuator means is located on said feed section.

4. A transporting system comprising a feed section including a plurality of feed section elements at spaced locations along said feed section for moving articles therethrough, the spacing between said feed section elements permitting the injection of articles therebetween, a distributor section connected to receive said articles from said feed section, said distributor section comprising a lower portion, an upper portion spaced above said lower portion, a lift section for moving articles from said lower portion to said upper portion, and a plurailty of spaced apart distributor section elements for moving articles through said distributor section, means for moving said feed section elements and said distributor section elements, the ratio of spacing to speed of said elements being the same for each of said sections at all times, and a plurality of disbursing stations at spaced apart locations along said distributor section for receiving articles being moved by said distributor section elements.

5. A transporting system comprising a feed section including a plurality of feed section elements at spaced locations along said feed section for moving articles therethrough, the spacing between said feed section elements permitting the injection of articles therebetween, a distributor section connected to receive said articles from said feed section, said distributor section comprising a plurality of spaced apart distributor section elements for moving articles therethrough, means for moving said feed section elements and said distributor section elements, the ratio of spacing to speed of said elements being the same for each of said sections, a plurality of disbursing stations at spaced locations along said distributor section for receiving articles being moved by said distributor section elements, a plurality of distributor feed stations at spaced locations along said distributor section, and an out station at the end of said distributor section, said distributor section moving articles injected by said distributor feed stations to said out station.

6. A system as in claim 1, and further including a second feed section having a plurality of spaced apart feed section elements for moving articles therethrough, said distributor section being connected to receive articles from said second feed section along with articles received from said first mentioned feed section, and a second plurality of disbursing stations at spaced locations along said distributor section for receiving articles injected into said distributor section by said second feed section.

7. A system as in claim 1, wherein at least one of said disbursing stations along said distributor section includes a plurality of drop-off stations.

8. A transporting system comprising a feed section including a plurality of feed section elements at spaced locations along said feed section for moving articles therethrough, the spacing between said feed section elements permitting the injection of articles therebetween, a distributor section connected to receive articles from said feed section, said distributor section comprising a lower portion, an upper portion spaced vertically above the lower portion and connected to said lower portion by a lift portion, and a plurality of spaced apart distributor section elements for moving articles therethrough, said distributor section elements comprising a plurality of pusher forks secured to an endless chain, said chain extending through said lower and upper portions and said lift portion of said distributor section, and said forks having portions extending in both directions from said chain, one portion of said forks moving articles through said lower portion and through said lift portion of said distributor section, and another portion of said forks moving articles through said upper portion of said distributor section, means for moving said feed section elements and said distributor section elements, the ratio of spacing to speed of said elements being the same for each of said sections, and a plurality of disbursing stations at spaced locations along said distributor section for receiving articles being moved by said distributor section elements.

9. A transporting system comprising a feed section including a plurality of feed section elements at spaced locations along said feed section for moving articles therethrough, a group of injector stations at spaced locations along said feed section, the spacing between said feed section elements permitting the injection of articles therebetween by said injector stations upon actuation of said injector stations, a distributor section connected to receive said articles from said feed section, said distributor section comprising a plurality of spaced apart distributor section elements for moving articles therethrough, means for moving said feed section elements and said distributor section elements, the ratio of spacing to speed of said elements being the same for each of said sections, a group of disbursing stations at spaced locations along said distributor section for receiving articles being moved by said distributor section elements, upon actuation of said disbursing stations, and actuator means connected to actuate one of said groups of injector and disbursing stations and responsive to the movement of the elements of one of said feed and distributor sections for simultaneously actuating the group of stations to which said actuator means is connected.

10. A system as in claim 9, and further including an auxiliary feed section including a plurality of spaced apart auxiliary feed section elements for moving articles therethrough, said auxiliary feed section being constructed such that articles may be manually inserted therein, and said first mentioned feed section being connected to receive articles from said auxiliary feed section and move such articles to said distributor section along with articles injected into said first mentioned feed section.

11. A transporting system comprising a feed section including a plurality of feed section elements at spaced locations along said feed section for moving articles therethrough, the spacing between said feed section elements permitting the injection of articles therebetween, and a distributor section connected to receive said articles from said feed section, said distributor section comprising a plurality of spaced apart distributor section elements for moving articles therethrough, means for moving said feed section elements and said distributor section elements, the ratio of spacing to speed of said elements being the same for each of said sections, a plurality of disbursing stations at spaced locations along said distributor section for receiving articles being moved by said distributor section elements, and the speed of movement of and the spacing between the elements of one of said sections being greater than the speed of movement of and the spacing between the elements of the other of said sections.

12. A system as in claim 11, wherein the speed of movement of and the space between the elements of said feed section is greater than the speed of movement of and the space between the elements of said distributor section.

13. A system as in claim 11, wherein the speed of movement of and the space between the elements of said distributor section is greater than the speed of movement of and the space between the elements of the feed section.

14. A method of sorting and conveying articles which comprises segregating a plurality of articles into predetermined sorted groups and inserting said articles at a feed section, conveying said articles to a distributing section remote from said feed section while maintaining the articles in said sorted groups, and removing all of said sorted groups to a plurality of spaced discharge stations at said distributing section, each of said discharge stations corresponding to one of said sorted groups, and at least one of the steps of inserting said articles and removing said articles being carried out simultaneously for all of said groups.

15. A method as in claim 14, wherein the step of inserting said articles is carried out simultaneously for all of said groups.

16. A method as in claim 14, wherein the step of removing said articles is carried out simultaneously for all of said groups.

17. A method as in claim 14, wherein both of said steps of inserting and removing said articles are carried out simultaneously for all of said groups.

18. A transporting system comprising a feed section including a plurality of feed section elements at spaced locations along said feed section for moving articles therethrough, the spacing between said feed section elements permitting the injection of articles therebetween, said articles being injected between said feed section elements in a preselected order relative to each other, a distributor section connected to receive said articles in said preselected order from said feed section, said distributor section comprising a plurality of spaced apart distributor section elements for moving articles therethrough while maintaining said preselected order, means for moving said feed section elements and said distributor section elements, the ratio of spacing to speed of said elements being the same for each of said sections, and a plurality of disbursing stations at spaced locations along said distributor section for receiving articles in said preselected order from said distributor section elements.

19. A system as in claim 18, and further including actuator means responsive to the movement of the elements of one of said feed and distributor sections for causing said articles to be simultaneously released in said preselected order at said disbursing stations.

20. A transporting system comprising a feed section including a plurality of feed section elements spaced a first distance apart along said feed section for moving articles therethrough, the spacing between said feed section elements permitting the injection of articles therebetween, a distributor section connected to receive said articles from said feed section, said distributor section comprising a plurality of distributor section elements spaced a second distance apart along said distributor section for moving articles therethrough, said second distance being larger than said first distance, means for moving said feed section elements and said distributor section elements, the ratio of spacing to speed of said elements being the same for each of said sections, and a plurality of disbursing stations at spaced locations along said distributor section for receiving articles being moved by said distributor section elements.

21. A system as set forth in claim 20, and further including actuator means responsive to the movement of the elements of one of said feed and distributor sections for causing said articles to be simultaneously released in a preselected order at said disbursing stations.

References Cited

UNITED STATES PATENTS

| | | | |
|---|---|---|---|
| 683,039 | 9/1901 | Hagen | 198—76 X |
| 2,497,874 | 2/1950 | Evans | 214—11 |
| 2,849,101 | 8/1958 | Austin | 198—38 |
| 2,946,427 | 7/1960 | Friedman | 198—38 |
| 3,212,623 | 10/1965 | Griffith | 198—38 |

EDWARD A. SROKA, *Primary Examiner.*

A. C. HODGSON, *Assistant Examiner.*

U.S. Cl. X.R.

198—42